(12) United States Patent
Langerbeins et al.

(10) Patent No.: US 12,378,349 B2
(45) Date of Patent: Aug. 5, 2025

(54) SELECTIVE POLYURETHANE PREPOLYMER SYNTHESIS

(71) Applicant: PolyU GmbH, Oberhausen (DE)

(72) Inventors: Klaus Langerbeins, Oberhausen (DE);
Michael Senzlober, Oberhausen (DE);
Judith Radebner, Oberhausen (DE)

(73) Assignee: PolyU GmbH, Oberhausen (DE)

(*) Notice: Subject to any disclaimer, the term of this patent is extended or adjusted under 35 U.S.C. 154(b) by 379 days.

(21) Appl. No.: 17/633,212

(22) PCT Filed: Aug. 12, 2020

(86) PCT No.: PCT/EP2020/072688
§ 371 (c)(1),
(2) Date: Feb. 7, 2022

(87) PCT Pub. No.: WO2021/028511
PCT Pub. Date: Feb. 18, 2021

(65) Prior Publication Data
US 2022/0372285 A1 Nov. 24, 2022

(30) Foreign Application Priority Data

Aug. 12, 2019 (EP) .................................... 19191328
Aug. 12, 2019 (EP) .................................... 19191330

(51) Int. Cl.
*C08G 18/16* (2006.01)
*C08G 18/08* (2006.01)
(Continued)

(52) U.S. Cl.
CPC .......... *C08G 18/163* (2013.01); *C08G 18/10* (2013.01); *C08G 18/14* (2013.01); *C08G 18/1808* (2013.01); *C08G 18/2018* (2013.01); *C08G 18/2081* (2013.01); *C08G 18/222* (2013.01); *C08G 18/246* (2013.01);
(Continued)

(58) Field of Classification Search
CPC .. C08G 18/163; C08G 18/10; C08G 18/4825; C08G 18/4829; C08G 18/289
See application file for complete search history.

(56) References Cited

U.S. PATENT DOCUMENTS

| 4,798,878 A | 1/1989 | Brinkmann et al. |
| 5,998,504 A | 12/1999 | Groth et al. |

(Continued)

FOREIGN PATENT DOCUMENTS

| CA | 3 150 038 A1 | 2/2021 |
| CN | 1909978 A | 2/2007 |

(Continued)

OTHER PUBLICATIONS

International Search Report for PCT/EP2020/072688 dated Nov. 6, 2020 [PCT/ISA/210].
Written Opinion for PCT/EP2020/072688 dated Nov. 6, 2020 [PCT/ISA/237].
(Continued)

*Primary Examiner* — Michael L Leonard
(74) *Attorney, Agent, or Firm* — Sughrue Mion, PLLC

(57) ABSTRACT

The present invention relates to a selective process for producing polyurethane prepolymers, to the polyurethane prepolymers obtainable from this process, and also to a process for producing moisture-crosslinking silylated polymers, more particularly silane-functional hybrid polymers, and also to the use thereof in CASE sectors (coatings, adhesives, sealants and elastomers).

5 Claims, 1 Drawing Sheet

(51) Int. Cl.
*C08G 18/10* (2006.01)
*C08G 18/18* (2006.01)
*C08G 18/20* (2006.01)
*C08G 18/22* (2006.01)
*C08G 18/24* (2006.01)
*C08G 18/28* (2006.01)
*C08G 18/30* (2006.01)
*C08G 18/46* (2006.01)
*C08G 18/48* (2006.01)
*C08G 18/71* (2006.01)
*C08G 18/75* (2006.01)
*C08G 18/76* (2006.01)
*C08G 18/77* (2006.01)
*C08G 18/78* (2006.01)
*C08G 18/79* (2006.01)
*C08G 77/04* (2006.01)
*C08L 75/04* (2006.01)
*C08G 101/00* (2006.01)

(52) U.S. Cl.
CPC ....... *C08G 18/2865* (2013.01); *C08G 18/289* (2013.01); *C08G 18/307* (2013.01); *C08G 18/4615* (2013.01); *C08G 18/4825* (2013.01); *C08G 18/4829* (2013.01); *C08G 18/718* (2013.01); *C08G 18/755* (2013.01); *C08G 18/7671* (2013.01); *C08G 18/778* (2013.01); *C08G 18/785* (2013.01); *C08G 18/792* (2013.01); *C08G 77/045* (2013.01); *C08L 75/04* (2013.01); *C08G 2101/00* (2013.01); *C08G 2110/0008* (2021.01); *C08G 2110/0025* (2021.01); *C08G 2110/0083* (2021.01); *C08G 2150/00* (2013.01); *C08G 2150/60* (2013.01); *C08G 2170/00* (2013.01); *C08G 2170/60* (2013.01); *C08G 2190/00* (2013.01); *C08L 2312/08* (2013.01)

(56) References Cited

U.S. PATENT DOCUMENTS

| | | | |
|---|---|---|---|
| 7,737,228 | B2 | 6/2010 | Lichtenhan et al. |
| 9,156,981 | B2 | 10/2015 | Lim et al. |
| 2003/0055193 | A1 | 3/2003 | Lichtenhan et al. |
| 2004/0024212 | A1 | 2/2004 | Bernard et al. |
| 2007/0055010 | A1 | 3/2007 | Ludewig et al. |
| 2009/0082502 | A1 | 3/2009 | Lichtenhan et al. |
| 2010/0125123 | A1 | 5/2010 | Lichtenhan et al. |
| 2012/0264840 | A1 | 10/2012 | Klein et al. |
| 2016/0046793 | A1 | 2/2016 | Phanopoulos et al. |
| 2016/0264708 | A1 | 9/2016 | Klein et al. |
| 2017/0198084 | A1 | 7/2017 | Holvoet et al. |
| 2020/0115503 | A1 | 4/2020 | Langerbeins et al. |
| 2022/0235169 | A1 | 7/2022 | Langerbeins et al. |
| 2022/0235171 | A1 | 7/2022 | Langerbeins et al. |
| 2022/0259365 | A1 | 8/2022 | Langerbeins et al. |
| 2023/0272147 | A1 | 8/2023 | Langerbeins et al. |

FOREIGN PATENT DOCUMENTS

| | | |
|---|---|---|
| CN | 101253209 A | 8/2008 |
| CN | 101253210 A | 8/2008 |
| CN | 102639584 A | 8/2012 |
| CN | 102781994 A | 11/2012 |
| CN | 104194708 A | 12/2014 |
| CN | 105308109 A | 2/2016 |
| CN | 105793327 A | 7/2016 |
| CN | 105829377 A | 8/2016 |
| CN | 106459362 A | 2/2017 |
| DE | 10 2007 037 641 A1 | 3/2008 |
| EP | 1 924 623 A1 | 5/2008 |
| EP | 2 468 759 A1 | 6/2012 |
| EP | 2546278 A2 | 1/2013 |
| EP | 3 392 313 A1 | 10/2018 |
| EP | 3 613 785 A1 | 2/2020 |
| EP | 3 715 396 A1 | 9/2020 |
| EP | 3 715 397 A1 | 9/2020 |
| EP | 4 013 802 | 6/2022 |
| JP | 2007-523968 A | 8/2007 |
| JP | 2009-507087 A | 2/2009 |
| JP | 2009-510229 A | 3/2009 |
| JP | 2016-516865 A | 6/2016 |
| JP | 2020-517771 A | 6/2020 |
| JP | 2022-525266 A | 5/2022 |
| TW | 200909462 A | 3/2009 |
| WO | 99/48942 A1 | 9/1999 |
| WO | 2007/025667 A1 | 3/2007 |
| WO | 2008/144735 A1 | 11/2008 |
| WO | 2009/065873 A2 | 5/2009 |
| WO | 2009/130297 A2 | 10/2009 |
| WO | 2010/022388 A2 | 2/2010 |
| WO | 2012/136657 A1 | 10/2012 |
| WO | 2015/032717 A1 | 3/2015 |
| WO | 2017/064139 A1 | 4/2017 |
| WO | 2018/158389 A1 | 9/2018 |
| WO | 2020/193430 A1 | 10/2020 |
| WO | 2021/028511 A1 | 2/2021 |

OTHER PUBLICATIONS

Office Action issued Mar. 4, 2024 in Canadian Application No. 3,150,038.
Office Action issued Mar. 11, 2024 in Canadian Application No. 3,133,585.
Office Action issued Mar. 12, 2024 in Japanese Application No. 2022-502323.
Communication dated Mar. 12, 2023 from the State Intellectual Property Office of P.R. of China in Application No. 202080021392.3.
Office Action issued Feb. 6, 2025 in U.S. Appl. No. 17/439,508.
Chinese Office Action dated Jul. 20, 2023 in Chinese Application No. 202080065973. 7.
International Search Report dated Dec. 2, 2021 issued by the International Searching Authority in PCT /EP2021 /072543.
International Search Report for PCT/EP2020/057864 dated May 20, 2020 [PCT/ISA/210].
International Search Report for PCT/EP2020/057868 dated Jun. 9, 2020 [PCT/ISA/210].
International Search Report of PCT/EP2020/057877 dated Jun. 9, 2020 [PCT/ISA/210].
English translation of Office Action issued Aug. 21, 2024 (drafted Aug. 15, 2024) in Japanese Application No. 2022-507410.
Office Action issued Jul. 3, 2024 in U.S. Appl. No. 17/439,606.
Office Action issued Jul. 8, 2024 in U.S. Appl. No. 17/439,508.
Office Action issued Oct. 11, 2024 in U.S. Appl. No. 17/439,604.
Written Opinion for PCT/EP2020/072688 dated Nov. 6, 2020 [PCT/ISA/237] (translation).
Office Action issued May 15, 2025, in U.S. Appl. No. 17/439,604.

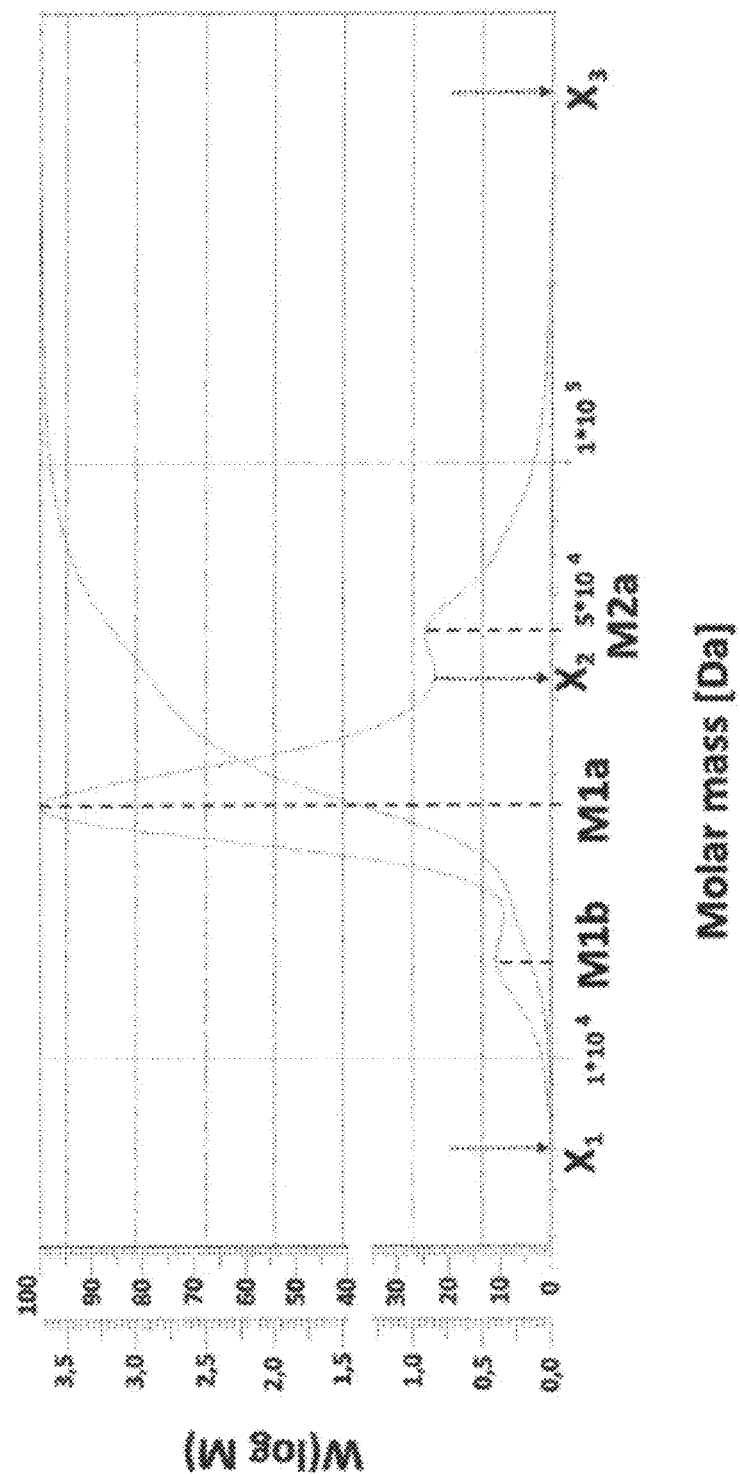

SELECTIVE POLYURETHANE PREPOLYMER SYNTHESIS

CROSS REFERENCE TO RELATED APPLICATIONS

This application is a National Stage of International Application No. PCT/EP2020/072688 filed Aug. 12, 2020, claiming priority based on European Patent Application No. 19191328.4 filed Aug. 12, 2019 and European Patent Application No. 19191330.0 filed Aug. 12, 2019.

The present invention relates to a selective process for producing polyurethane prepolymers, to the polyurethane prepolymers obtainable from this process, and also to a process for producing moisture-crosslinking polymers, more particularly silane-functional hybrid polymers, and also to the use thereof in CASE sectors (coatings, adhesives, sealants and elastomers).

Polymers and oligomers produced from compounds carrying isocyanate groups, by reaction with hydroxyl- or amine-functional compounds, have been known for a long time and in great chemical diversity. Depending on the stoichiometry of the reaction and the nature of the starting compounds, the products, accordingly, are prepolymers containing urethane and/or urea groups and carrying, terminally, reactive isocyanate, hydroxyl or amine groups, which in the synthesis can either be reacted further in a downstream step or can be used as crosslinkable base materials for adhesives and sealants or else as coating materials.

Particularly widespread and of economic importance are urethane prepolymers carrying isocyanate groups (NCO prepolymers). Additionally known are urethane prepolymers which contain curable functional groups such as silane groups.

To obtain polyurethanes having terminal NCO groups it is common practice to react polyfunctional alcohols with an excess of isocyanate-containing compounds, generally polyisocyanates. These NCO-terminated polyurethane prepolymers may then serve as starter materials for the production of silylated polymers, in which case the NCO prepolymer is reacted with a corresponding aminosilane.

Silylated polyurethanes which undergo condensation ("crosslink") on contact with water or atmospheric moisture and at room temperature have been known for some considerable time. They are also referred to as moisture-crosslinking polymers. Factors such as silane group content and silane group structure determine whether long-chain polymers, wide-meshed three-dimensional networks or highly crosslinked systems are formed.

Moisture-crosslinking polymers, especially silylated polyurethanes, have already long been used diversely as adhesives and sealants. The sector of traditional silicone adhesives and sealants based on dimethylpolysiloxanes, and of polyurethane adhesives and sealants having free isocyanate groups, has developed accordingly to the point of silane-terminated adhesives and sealants.

The conversion of long-chain polyols to NCO prepolymers and their subsequent silylation with alkoxy silanes containing NCO-reactive groups has been described in—for example—EP 1 093 482 A1. The high viscosity of the silane-modified polymers, however, means that plasticizers and reactive diluents are needed.

Silane-modified polymers (SMPs) of high viscosity, if they are used in the sector of sealant and adhesive systems, require typical amounts of 30-50 wt % of inorganic fillers such as calcium carbonate or silicates, resulting in poor processing properties. The addition of plasticizers and diluents, which are needed for effective processing, brings problems caused by possible plasticizer migration. The addition of viscosity-reducing reactive diluents or monomeric alkoxysilanes leads to unfavourable costs and higher methanol emissions from the adhesive systems.

EP 1 924 623 A1 describes urethane prepolymers which contain alkoxysilyl groups for example, and which are allophanate-modified, their allophanate structure containing a moisture-curing silane-functional radical. Through controlled allophanatization, the prior art has attempted to counteract the high viscosities which result from strong intermolecular hydrogen bonds and dipolar interactions of the urethane units and, where appropriate, urea units with one another. Example 1 sets out how the conversion of a PPG having a molecular weight of around 8000 g/mol (Acclaim 8200) with an initial viscosity of around 3000 mPas in the most favourable case and with use of secondary aminosilanes leads to polymers having a viscosity of 20500 mPas.

EP 2 468 759 A1 describes urethane prepolymers which likewise contain alkoxysilyl groups and which are modified with substituted aminosilanes. Examples 8-14 convert PPGs having a molecular weight of around 12000 g/mol (Acclaim 12200) with IPDI in a molar ratio of 1:2.4 into PU prepolymers having a viscosity of 40000 mPas. The subsequent reaction with various aminosilanes shows the advantage of secondary aminosilanes as end cappers in comparison to primary aminosilanes. In spite of this, the lowest viscosity achieved (example 13), at 81000 mPas, was very high, and likewise suggests a high proportion of oligomeric constituents.

The processes described in the prior art for producing NCO-terminated polyurethane prepolymers frequently operate with a relatively high excess of polyisocyanate, meaning that the excess polyisocyanate must be separated off in a costly and inconvenient distillation process, or they have a high fraction of higher oligomers, leading to an increase in viscosity. In the case of long-chain polyols in particular, oligomerization leads to a considerable increase in viscosity and to considerable disadvantages affecting the processing properties of such NCO prepolymers.

At the same time, the processes described in the prior art for producing silylated polyurethanes frequently produce products of very high viscosity, making it more difficult for the polymers to be further-processed and formulated. In this case the viscosity of the silylated polymers is already influenced considerably by the viscosity of the previously produced NCO-terminated polyurethane prepolymers. Insufficient selectivity in the reaction regime here leads to NCO-terminated prepolymers having high viscosity and therefore poor processing properties.

It was an object of the present invention, therefore, to provide NCO polyurethane prepolymers, and silylated polyurethane polymers containing urethane groups and preparable from said prepolymers, featuring a reduced fraction of higher oligomers. The products are intended as far as possible to possess a suitable viscosity in terms of advantageous further processing, and to possess better processing properties.

In spite of the prior art, there continues to be a need for polyurethanes which carry NCO end groups, and also for the silylated polyurethanes preparable from them, which have low viscosities and are therefore suitable for a broad spectrum of applications and, moreover, which are easy to process at room temperature in particular.

The object is achieved in accordance with the invention through the provision of polyurethane prepolymers obtainable according to Claim 1. Advantageous developments are subjects of the dependent claims or of the co-independent claims. A further subject of the invention are compositions comprising a mixture of two or more polyurethane prepolymers of the invention. The same is true of silylated polyurethanes obtainable from these polyurethane prepolymers.

It has surprisingly been found that through a kinetically controlled regime in the reaction of isocyanate-containing compounds and hydroxy-functionalized polymers, it is possible to produce NCO-terminated polyurethane prepolymers (here also just "polyurethane prepolymers") having a narrow molar mass distribution. These prepolymers have a low viscosity. The reaction kinetics here are determined in particular through the parameters of reaction temperature, nature and amount of catalyst, and reaction time.

By controlling the process regime in a manner known in principle to the skilled person, it is possible selectively to produce NCO-terminated polyurethane prepolymers. The selectivity of the reaction can be represented by an analysis of the molecular weight distribution. The polyurethane prepolymers of the invention can therefore be characterized by way of their molecular weight distribution.

Accordingly the selectivity may be verified and represented using, for example, gel permeation chromatography (for short: GPC). An elugram obtained from an analysis of polyurethane prepolymer by GPC is able to plot the elution volume, which progresses with the continuous flow of the eluate, against the associated signal intensities from the detector. The elugram shows, in its profile, "when"—that is, at which elution volume (V, mL)—which constituent of the sample is detected by the detector. Here, the constituents with high molar weights are detected first, and constituents with low molar weights later. Owing to the continuous measurement profile, the result is a curve profile with rising and falling regions (i.e. the intensity of the signal rises or falls). The height of the intensity and the area integral below it show, among other things, the amounts in which the respective constituents are present in the sample, depending on the sample concentration injected.

Through a comparison of the elution volume of a sample constituent of unknown molar mass with the elution volumes of molecules of known molar mass (co-migration standard), it is possible to determine an associated molar mass through comparison with the generated graph, or arithmetically by means of a standardized regression analysis. From this, as the inverse plot of the molar weights against the associated signal intensities of the eluted sample, it is possible to obtain a corresponding molar mass distribution. This plot is referred to presently as the molecular weight profile. The profile here starts on the x-axis of the diagram with sample constituents of lower molecular weight and correspondingly, as the profile of the x-axis progresses, shows intensity signals of the higher molecular weights.

The molecular weight profile of the polyurethane prepolymers of the invention shows, in a range from 2000 Da ($x_1$) to 200000 Da ($x_3$) along the x-axis, that it has a first section with an area integral $F_I$ and a second section with an area integral $F_{II}$, for which the ratio $F_{II}/F_I$ is between 0 up to and including 0.4, preferably between 0.05 to 0.39, more preferably between 0.1 to 0.38, where the first section extends from $x_1$ to $x_2$ and the second section extends from $x_2$ to $x_3$, and $x_2$ defines the extreme point between the (last) intensity maximum in the first section (M1a), which is in the range of the molecular weight of the hydroxy-functionalized polymer (see the FIGURE), and the first subsequent intensity maximum in the second section (M2).

"Extreme point" in the present context preferably describes a minimum point or else intensity minimum.

"Molecular weight" may be used synonymously for the term "molar weight" or "molar mass". It may be expressed either in daltons (Da) or else, synonymously, in grams per mole (g/mol).

The FIGURE describes the molecular weight profile for calculating the ratio of the area integrals ($F_{II}/F_I$). It shows the curve profile of one such molecular weight profile in a range from 2000 to 200000 Da (for Da also synonymously g/mol).

In the first section there may be one or more further intensity maxima (e.g. M1b). The area integral of all of these maxima in the first section form the area integral $F_I$ ($F_I$=F (M1a)+F(M1b)+ . . . ).

In the second section there may likewise be one or more further intensity maxima (e.g. M2a). Each area integral of the intensity maxima (M2) present in the second section forms part of the sum total of the area integral $F_{II}$ ($F_{II}$=F (M2a)+F(M2b)+ . . . ). In the invention the ratio of $F_{II}$ to $F_I$ is in the range between 0 up to and including 0.4, preferably between 0.05 up to and including 0.39, more preferably between 0.1 up to and including 0.38.

The position of the intensity maximum M1a is situated in the range of the molecular weight of the particular hydroxy-functionalized polymer used. It follows from this that the position of $x_2$ is likewise dependent on the molecular weight of the hydroxy-functionalized polymer used.

The intensity maximum M1a is situated, accordingly, in the molecular weight range of the polyurethane prepolymers of the invention that have the following formula A,

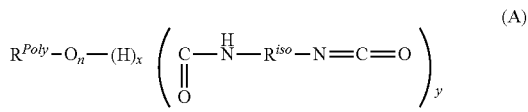

where n = x+y
n is the number of OH groups in the polyol/functionality in which $R^{Iso}$ is the structural unit of the isocyanate-containing compound and $R_{Poly}$ is the structural unit of the hydroxy-functionalized polymer, where n is x+y and n indicates the number of OH groups in the polyol (functionality).

The area $F_I$ here corresponds to the molecular weight range of the polyurethane prepolymer of the invention which is obtained by reaction of an NCO group of the polyisocyanate. $F_{II}$ corresponds to the molecular weight range of the higher oligomers, where higher oligomers are the reaction products obtained in the production of the NCO-terminated prepolymers and for which the polyisocyanate used has reacted at more than one NCO group, such as, for example, allophanate reaction products, biuret reaction products, isocyanurates and oligomer blocks longer than isocyanate-polymer-isocyanate.

For the computer-controlled software, preference is given to using the system PSS WinGPC UniChrom V 8.31, Build 8417 from PSS GmbH, DE.

The polyurethane prepolymers of the invention are obtainable by a reaction of
I. at least one isocyanate-containing compound having a molecular weight of 120 g/mol to 1000 g/mol with
II. a hydroxy-functionalized polymer having a number-average molecular weight $M_n$ of 3500 to 100000 g/mol, preferably 3800 to 90000, more preferably of 4000 to 80000 g/mol, in the presence of a catalyst.

As a result of the conversion of the polyurethane prepolymers of the invention into silylated polyurethanes, there is no significant change in the molecular weight distribution, and consequently a calculation of the area quotient of the invention on the basis of the silylated polyurethanes is permissible, subject to the proviso that there is no water-induced condensation of the silylated polyurethane.

In the present invention the molecular weight is measured by a molecular weight distribution obtained by GPC (gel permeation chromatography), under the following conditions: The columns are conditioned in an oven heated to 70 degrees Celsius. Guided to the columns held at this temperature is THF (tetrahydrofuran) as solvent, with a flow rate of 1 ml per minute, and 50 to 200 μl of a THF sample solution of a polyurethane prepolymer, with a sample concentration of 0.5 to 1.5 g/L, are injected for the measurement.

For the measurement, the molecular weight distribution ascribed to the sample is calculated from the relationship between the logarithmic value of a calibration curve, produced using a plurality of types of monodisperse polystyrene standard samples, and the count number for the elution time.

Examples of suitable standard polystyrene samples for producing the calibration curve are samples having molecular weights Mp [Da] as follows: 66000; 42400; 25500; 15700; 8680; 6540; 4920; 3470; 2280; 1306; 370; 266, which are available from PSS Polymer-Standards-Service GmbH, Mainz, Germany. The detector used is a refractive index detector (RI detector).

The GPC columns can be used preferably in combination with a multiplicity of commercially available polystyrene gel columns. For example, they may consist preferably of a combination of Agilent PLGEL 5 μm MIXED-D, 7.5×300 mm columns and PLGEL 3 μm MIXED-E, 7.5×300 mm columns, with the combination consisting of three columns, where the first two columns are the PLGEL 5 μm MIXED-D columns and the third column is the PLGEL 3 μm MIXED-E, 7.5×300 mm column.

In the examples described later, the molecular weight distribution of the polyurethane prepolymer is measured under the conditions indicated there.

In the reaction for producing the polyurethane prepolymers of the invention, the selected molar ratio of NCO groups to hydroxyl groups in the reaction of I. with II. is preferably from 5.0:1 to 1.05:1, more preferably from 4:1 to 1.5:1 and very preferably from 3.0:1 to 1.8:1.

Isocyanate-containing compounds contain at least one NCO group (=isocyanate group). A distinction may be made between monoisocyanates (z=1) and polyisocyanates (z≥2). The NCO groups may react, for example, with alcohols to give urethanes or with amines to give urea derivatives. The isocyanate-containing compounds of the invention may be described by the general formula (VI).

where $R^x$ is a carbon-containing group, preferably at least one aromatic or aliphatic group or mixtures thereof, more preferably an optionally substituted, straight-chain or branched C1 to C20 alkyl group, an optionally substituted, straight-chain or branched C2 to C20 alkenyl group or an optionally substituted, straight-chain or branched C2 to C20 alkynyl group, an optionally substituted C4 to C14 cycloalkyl group or an optionally substituted C4 to C14 aryl group, very preferably diphenylmethane, toluene, dicyclohexylmethane, hexane or methyl-3,5,5-trimethylcyclohexyl, or $R^x$ is a group $—(R^*)—Si(YR^{9/10/11})_3$, where $R^9$, $R^{10}$ and $R^{11}$ independently of one another are H, an optionally substituted, straight-chain or branched C1 to C25 alkyl group, an optionally substituted, straight-chain or branched C2 to C25-alkenyl group or an optionally substituted C4 to C18 cycloalkyl group or an optionally substituted C4 to C18 aryl group, $R^*$ is O or an optionally substituted, straight-chain or branched C1 to C25 alkyl group or an optionally substituted C4 to C18 cycloalkyl group or an optionally substituted C4 to C18 aryl group, and if $R^*$ is 0, the Si atom is connected directly to the N atom, each Y independently of any other is either O or a direct bond of the Si atom to the respective radical $R^9$, $R^{10}$ or $R^{11}$; preferably at least one Y is O, and z is 1.

Polyisocyanates used for producing the polyurethane prepolymer of the invention may be commercially customary isocyanates, more particularly polyisocyanates of the general formula (VI)

where $R^x$ is a carbon-containing group, preferably at least one aromatic or aliphatic group or mixtures thereof, more preferably an optionally substituted, straight-chain or branched C1 to C20 alkyl group, an optionally substituted, straight-chain or branched C2 to C20 alkenyl group or an optionally substituted, straight-chain or branched C2 to C20 alkynyl group, an optionally substituted C4 to C14 cycloalkyl group or an optionally substituted C4 to C14 aryl group, very preferably diphenylmethane, toluene, dicyclohexylmethane, hexane or methyl-3,5,5-trimethylcyclohexyl, and z is at least 2.

Examples of suitable polyisocyanates include diphenylmethane diisocyanate (MDI), especially diphenylmethane 4,4'-diisocyanate (4,4'-MDI), diphenylmethane 2,4'-diisocyanate (2,4'-MDI), diphenylmethane 2,2'-diisocyanate (2,2'-MDI), 4,4'-diisocyanatodicyclohexylmethane (H12MDI), 2-methylpentamethylene 1,5-diisocyanate, 2,2,4- and 2,4,4-trimethyl-1,6-hexamethylene diisocyanate (TMDI), 1,12 dodecamethylene diisocyanate, lysine diisocyanate and lysine ester diisocyanate, cyclohexane 1,3-diisocyanate, cyclohexane 1,4-diisocyanate, 3-isocyanatomethyl-3,5,5-trimethylcyclohexyl isocyanate (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,6 hexamethylene diisocyanate (HDI) or its trimer (HDI trimer), 1,4-bis(isocyanato)cyclohexane, 1,4-bis(isocyanate)benzene (PPDI), 1,3- and/or 1,4-bis(isocyanatomethyl)cyclohexane, m- and/or p-xylylene diisocyanate (m- and/or p-XDI), m- and/or p-tetramethyl-1,3-xylylene diisocyanate, bis(1-isocyanato-1-methylethyl)naphthalene, 2,4- and 2,6-toluene diisocyanate (TDI), 1,3- and 1,4-phenylene diisocyanate, 2,4-dioxo-1,3-diazetidine-1,3-bis(methyl-m-phenylene) diisocyanate, 2,3,5,6-tetramethyl-1,4-diisocyanatobenzene, naphthaline 1,5-diisocyanate (NDI), 3,3'3'-dimethyl-4,4',4'-diisocyanatobiphenyl (TODI), or mixtures thereof, preferably diphenylmethane 4,4'-diisocyanate (4,4'-MDI), diphenylmethane-2,4'-diisocyanate (2,4'-MDI) or isophorone diisocyanate (IPDI), 1,6 hexamethylene diisocyanate (HDI) or its trimer (HDI trimer) or mixtures thereof, very preferably diphenylmethane 4,4'-diisocyanate (4,4'-MDI), diphenylmethane 2,4'-diisocyanate (2,4'-MD) or isophorone diisocyanate (IPDI), oligomers and polymers of the aforesaid isocyanates, and also any desired mixtures of the aforesaid isocyanates.

Preference is given to aromatic, aliphatic or cycloaliphatic polyisocyanates having a molecular weight of 120 g/mol to 1000 g/mol, which possess NCO groups having a different reactivity towards diols. The different reactivity of the NCO groups of the polyisocyanate comes about through differently adjacent substituents to the NCO groups on the molecule, which by steric shielding, for example, lower the reactivity of one NCO group in comparison to the other NCO group, and/or by different binding of an NCO group to the rest of the molecule, in the form of a primary or secondary NCO group, for example.

Examples of preferred aromatic polyisocyanates are all the isomers of toluene diisocyanate (TDI), either in isomerically pure form or as a mixture of two or more isomers, naphthaline 1,5-diisocyanate (NDI), naphthaline 1,4-diisocyanate (NDI), diphenylmethane diisocyanate (4,4'-MDI), diphenylmethane 2,4'-diisocyanate (2,4'-MDI), and also mixtures of 4,4'-diphenylmethane diisocyanate (4,4'-MDI) with the 2,4'-MDI isomer, and 1,3-phenylene diisocyanate.

Examples of preferred cycloaliphatic polyisocyanates are, for example, 1-isocyanatomethyl-3-isocyanato-1,5,5-trimethylcyclohexane (isophorone diisocyanate, IPDI), 1-methyl-2,4-diisocyanatocyclohexane or hydrogenation products of the aforesaid aromatic polyisocyanates, especially hydrogenated MDI in isomerically pure form, preferably hydrogenated 2,4'-MDI.

Examples of preferred aliphatic polyisocyanates are 1,6-diisocyanato-2,2,4-trimethylhexane, 1,6-diisocyanato-2,4,4-trimethylhexane and lysine diisocyanate.

Particular preference is given to isophorone diisocyanate, (IPDI) and also diphenylmethane-2,4'-diisocyanate (2,4'-MDI) and also diphenylmethane 4,4'-diisocyanate (4,4'-MDI), and also mixtures thereof. Especially preferred is IPDI, and also mixtures with the aforesaid polyisocyanates.

It is likewise possible to use isophorone diisocyanate (IPDI) and also diphenylmethane 2,4'-diisocyanate (2,4'-MDI) and also diphenylmethane 4,4'-diisocyanate (4,4'-MDI), and also mixtures thereof, in combinations with further isocyanate-containing compounds.

Hydroxy-functional compounds are understood to mean hydroxy-functional polymers. Suitable polyols for the production of polyurethane polymers are, in particular, polyether polyols, polyester polyols and polycarbonate polyols, and also mixtures of these polyols. The hydroxy-functional compounds preferably have a number-average molecular weight $M_n$ of 3500 to 100000 g/mol, preferably 3800 to 90000, more preferably of 4000 to 80000 g/mol.

The hydroxy-functionalized polymer is preferably selected from the group consisting of polyoxyalkylene diols or polyoxyalkylene triols, more particularly polyoxyethylene and polyoxypropylene diols and triols, polyols of higher functionality such as sorbitol, pentaerythritol-started polyols, ethylene oxide-terminated polyoxypropylene polyols, polyester polyols, styrene-acrylonitrile, acrylic-methacrylate, (poly)urea-grafted or -containing polyether polyols, polycarbonate polyols, $CO_2$ polyols, polytetrahydrofuran-based polyethers (PTMEG), OH-terminated prepolymers based on the reaction of a polyetherol or polyesterol with a polyisocyanate, polypropylene diols, polyester polyols or mixtures thereof, preferably polypropylene diols, polyester polyols, or mixtures thereof.

"Polyethers" constitute one class of the polymers. They are long-chain compounds comprising at least two identical or different ether groups. In the invention, the term "polyethers" is also used if the polymeric ether groups are interrupted by other groups (e.g. by copolymerized/incorporated isocyanates or further polymer or oligomer units having a different monomer origin).

Especially suitable polyether polyols, also called polyoxyalkylene polyols or oligoetherols, are those which are polymerization products of ethylene oxide, 1,2-propylene oxide, 1,2- or 2,3-butylene oxide, oxetane, tetrahydrofuran or mixtures thereof, optionally polymerized by means of a starter molecule having two or more active hydrogen atoms such as, for example, water, ammonia or compounds having two or more OH or NH groups such as, for example, 1,2-ethanediol, 1,2- and 1,3-propanediol, neopentyl glycol, diethylene glycol, triethylene glycol, the isomeric dipropylene glycols and tripropylene glycols, the isomer butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and also mixtures of the stated compounds.

One particular embodiment uses polyether polyols having block copolymer structures. These may be used by reaction of the above-stated cyclic ethers with oligomeric starting blocks such as, for example, polyoxytetramethylene-, polyoxyethylene-, polybutadiene-, polyisoprene-, polyamide-, polycaprolactone-, polyurethane—with hydroxyalkyl-substituted polydimethylsiloxanes, hydroxyl-containing polyacrylates and/or polymethacrylates or polyesters, as described for example in EP 2 546 278 A1, EP 2 271 691 A1, EP 2 493 957 A1 and WO 09/133061 A1.

Another embodiment uses copolymers of carbon dioxide and cyclic ethers, especially propylene oxide. Copolymers of these kinds are obtainable by diverse processes, such as, for example, in WO 2015/032717 A1, WO 2012/136657 A1, EP 2 321 364 A1 and WO 2018/158389 A1, using organometallic catalysts such as, for example, DMC and cobalt complexes and chromium complexes. Owing to the high viscosity of these copolymers by comparison with pure polyethers, the process of polyurethane prepolymer synthesis of the invention is particularly advantageous. Copolymers of these kinds may also be produced by reaction of alcohols with dialkyl carbonates such as dimethyl carbonate, diaryl carbonates such as diphenyl carbonate or phosgene. Particularly suitable are polycarbonate diols, especially amorphous polycarbonate diols.

Monools as well can be used in the process of the invention. In this case the starter molecule used for the polymerization with cyclic ethers comprises monofunctional alcohols, such as methanol, undecyl alcohol and isopropanol, for example. Also possible is the use of oligomeric monofunctional alcohols such as ethoxylated fatty alcohols.

It is possible to use not only polyoxyalkylene polyols having a low degree of unsaturation (measured according to ASTM D-2849-69 and expressed in milliequivalents of unsaturation per gram of polyol (meq/g)), produced for example using what are called double metal cyanide complex catalysts (DMC catalysts), but also polyoxyalkylene polyols having a higher degree of unsaturation, produced for example using anionic catalysts such as NaOH, KOH, CsOH or alkali metal alkoxides. Particularly suitable are polyoxyethylene polyols and polyoxypropylene polyols, more particularly polyoxyethylene diols, polyoxypropylene diols, polyoxyethylene triols and polyoxypropylene triols.

Especially suitable are polyoxyalkylene diols or polyoxyalkylene triols having a degree of unsaturation of less than 0.02 meq/g, and also polyoxyethylene diols, polyoxyethylene triols, polyoxypropylene diols and polyoxypropylene triols having a molecular weight of 3500 to 100000 g/mol, preferably 3800 to 90000 g/mol and more preferably 4000 to 80000 g/mol.

Likewise particularly suitable are what are called ethylene oxide-terminated ("EO-endcapped", ethylene oxide-end capped) polyoxypropylene polyols. The latter are specific polyoxypropylene-polyoxyethylene polyols which are obtained, for example, by subjecting pure polyoxypropylene polyols, especially polyoxypropylene diols and triols, to further alkoxylation with ethylene oxide after the end of the polypropoxylation reaction, and which consequently contain primary hydroxyl groups. Preference in this case is given to polyoxypropylene-polyoxyethylene diols and polyoxypropylene-polyoxyethylene triols. Additionally suitable are polybutadiene polyols terminated with hydroxyl groups, such as those, for example, produced by polymerization of 1,3-butadiene and allyl alcohol or by oxidation of polybutadiene, and also their hydrogenation products. Additionally suitable are styrene-acrylonitrile-grafted polyether polyols, of the kind available commercially, for example, under the tradename Lupranol® from Elastogran GmbH, Germany.

Especially suitable as polyester polyols are polyesters which carry at least two hydroxyl groups and are produced by known processes, particularly by the polycondensation of hydroxycarboxylic acids or the polycondensation of aliphatic and/or aromatic polycarboxylic acids with dihydric or polyhydric alcohols.

Especially suitable polyester polyols are those produced from di- to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforesaid alcohols with organic dicarboxylic acids or their anhydrides or esters such as, for example, succinic acid, glutaric acid, adipic acid, trimethyladipic acid, suberic acid, azelaic acid, sebacic acid, dodecane dicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride or mixtures of the aforesaid acids, and also polyester polyols from lactones such as ε-caprolactone, for example. Particularly suitable are polyester diols, especially those produced from adipic acid, azelaic acid, sebacic acid, dodecane dicarboxylic acid, dimer fatty acid, phthalic acid, isophthalic acid and terephthalic acid as dicarboxylic acid or from lactones such as, for example, ε-caprolactone and from ethylene glycol, diethylene glycol, neopentyl glycol, 1,4-butanediol, 1,6-hexanediol, dimer fatty acid diol and 1,4-cyclohexanedimethanol as dihydric alcohol.

Particularly suitable polyols are polyester polyols and polyether polyols, more particularly polyoxyethylene polyols, polyoxypropylene polyol and polyoxypropylene-polyoxyethylene polyol, preferably polyoxyethylene diol, polyoxypropylene diol, polyoxyethylene triol, polyoxypropylene triol, polyoxypropylene-polyoxyethylene diol and polyoxypropylene-polyoxyethylene triol.

The viscosity of the prepolymers based on polyols with a molecular weight of $M_n$ 12000 g/mol, these prepolymers being producible by the process of the invention, is preferably in the range from 10000 to 20000 mPas. With a molecular weight Ma of 18000 g/mol, the viscosity is in the range from 40000 to 50000 mPas (determined by Brookfield Rheometer DV-3T Extra at 25° C., the spindle size and spindle speed being selected such that the torque is >90%). It may therefore be at least 30% below the viscosity of those prepolymers not produced by processes of the invention.

The process of the invention is carried out preferably at temperatures of at least 0° C., preferably at least 20° C. and preferably not more than 150° C., more particularly not more than 80° C.

The temperature when producing the polyurethane prepolymers of the invention is very preferably between 10° C. and 120° C., preferably between 15° C. to 100° C., more preferably between 20° C. and 90° C. and very preferably between 25° C. and 85° C.

Suitable catalysts for producing the polyurethane prepolymers of the invention are selected from the group of metal-siloxane-silanol(ate) compounds and also organometallic compounds of the elements aluminium, tin, zinc, titanium, manganese, iron, bismuth, zirconium such as, for example, dibutyltin laurate, zinc octoate or titanium tetraisopropoxide, or else tertiary amines such as 1,4-diazabicyclo[2.2.2]octane, for example.

The term "catalyst" denotes a substance which lowers the activation energy for a particular reaction and so increases the reaction rate.

The term "metal-siloxane-silanol(ate)" denotes all metal-siloxane compounds which contain either one or two or more silanol and/or silanolate groups. In one embodiment of the invention it is likewise possible for the catalyst present to comprise exclusively metal-siloxane-silanolates. Unless there is differentiation in a particular case between these different scenarios, all combinations are included. In the text below, the metal-siloxane-silanol(ate) compounds just described (=metal-siloxane-silanol/silanolate compounds) are also referred to as oligomeric metallo-silsesquioxanes, "POMS", metal-silsesquioxanes or metallized silsesquioxanes. The terms are used interchangeably below.

In one embodiment of the present invention, the metal-siloxane-silanol(ate) compound may take the form of a monomer, oligomer and/or polymer for producing the polyurethane prepolymers of the invention, with the transition from oligomers to polymers being fluid in accordance with the general definition.

The metal or metals in the oligomeric and/or polymeric metal-siloxane-silanol(ate) compound were preferably present terminally and/or within the chain.

In the production of the polyurethane prepolymers of the invention the catenary (chain-like) metal-siloxane-silanol(ate) compound is linear, branched and/or a cage.

A "cage" or an oligomeric or polymeric "cage structure" for the purposes of the invention is a three-dimensional arrangement of the catenary metal-siloxane-silanol(ate) compound, with individual atoms in the chain forming the vertices of a multifaceted base structure of the compound. In this case the mutually linked atoms form at least two surfaces, giving rise to a common intersection. In one embodiment of the invention, for example, a cubic base structure of the compound is formed. A one-cage structure or else a cage structure in singular form, i.e. a compound which is defined by an isolated cage, represents the structure (IVc). Compounds having multiple cages within the compound may be described by the compounds (I) and also (Ia) to (Id).

A cage in the invention may be "open" or else "closed". This depends on whether all of the vertices are connected, joined or coordinated so as to form a closed cage structure. One example of a closed cage are the structures (II), (IV), (IVb), (IVc).

In the invention the term "-nuclear" gives the nuclearity of a compound—how many metal atoms it contains. A mononuclear compound has one metal atom, while a poly- or dinuclear compound has two metal atoms within a compound. The metals here may be connected directly to one another or linked via their substituents. An example of a mononuclear compound of the invention is represented, for example, by the structures (IV), (IVb), (IVc), (Ia), (Ib) or (Ic); a dinuclear compound is represented by structure (Id).

A mononuclear one-cage structure is represented by the metal-siloxane-silanol(ate) compounds (IV), (IVb) and (IVc). Mononuclear two-cage structures are, for example, the structures (Ia), (Ib) or (Ic).

The metal-siloxane-silanol(ate) compound in the production of the polyurethane prepolymers of the invention preferably comprises an oligomeric metal-silsesquioxane.

More particularly the metal-siloxane-silanol(ate) compound in the production of the polyurethane prepolymers of the invention comprises a polyhedral metal-silsesquioxane.

In one embodiment the metal-siloxane-silanol(ate) compound has the general formula $R^*_q Si_r O_s M_t$, where each $R^*$ independent of any other is selected from the group consisting of optionally substituted C1 to C20 alkyl, optionally substituted C3 to C8 cycloalkyl, optionally substituted C2 to C20 alkenyl, optionally substituted C5 to C10 aryl, —OH and —O—(C1 to C10 alkyl), each M independent of any other is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi;

q is an integer from 4 to 19, r is an integer from 4 to 10, s is an integer from 8 to 30, and t is an integer from 1 to 8.

In another embodiment the metal-siloxane-silanol(ate) compound has the general formula $R^\#_4 Si_4 O_{11} Y_2 Q_2 X_4 Z_3$, where each X independently of any other is selected from the group consisting of Si, $M^1$, $-M^3 L^1_A$, $M^3$, or $—Si(R^8)—O-M^3 L^1_A$, where $M^1$ and $M^3$ independently of one another are selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi; and where $L^1$ is selected from the group consisting of —OH and —O—(C1 to C10 alkyl), more particularly —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $R^8$ is selected from the group consisting of optionally substituted C1 to C20 alkyl, optionally substituted C3 to C8 cycloalkyl, optionally substituted C2 to C20 alkenyl and optionally substituted C5 to C10 aryl;

each Z independently of any other is selected from the group consisting of $L^2$, $R^5$, $R^6$ and $R^7$, where $L^2$ is selected from the group consisting of —OH and —O—(C1 to C10 alkyl), more particularly —O—(C1 to C8 alkyl) or —O—(C1 to C6 alkyl), or where $L^2$ is selected from the group consisting of —OH, —O-methyl, —O-ethyl, —O-propyl, —O-butyl, —O-octyl, —O-isopropyl, and —O-isobutyl;

each $R^\#$, $R^5$, $R^6$ and $R^7$ independently of one another is selected from the group consisting of optionally substituted C1 to C20 alkyl, optionally substituted C3 to C8 cycloalkyl, optionally substituted C2 to C20 alkenyl and optionally substituted C5 to C10 aryl; each Y independently of any other is $—O-M^2-L^3_A$, or two Ys are taken together and together are $—O-M^2(L^3_A)-O—$ or —O—, where $L^3$ is selected from the group consisting of —OH and —O—(C1 to C10 alkyl), more particularly —O—(C1 to C8 alkyl) or —O—(C1 to C6 alkyl), or where $L^3$ is selected from the group consisting of —OH, —O-methyl, —O-ethyl, —O-propyl, —O-butyl, —O-octyl, —O-isopropyl, and —O-isobutyl, and each $M^2$ independently of any other is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi;

each Q independently of any other is H, $M^4 L^4_A$, $—SiR^8$, $-M^3 L^1_A$, or in each case a single bond linked to $M^3$ of X or a single bond linked to the Si atom of the radical $—Si(R^8)—O-M^3 L^1_A$, where $M^3$, $R^8$ and $L^1$ are as defined for X, where $M^4$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi; and where $L^4$ is selected from the group consisting of —OH and —O—(C1 to C10 alkyl), more particularly —O—(C1 to C8 alkyl) or —O—(C1 to C6 alkyl), or where $L^4$ is selected from the group consisting of —OH, —O-methyl, —O-ethyl, —O-propyl, —O-butyl, —O-octyl, —O-isopropyl, and —O-isobutyl, with the proviso that at least one X is $M^3$, $-M^3 L^1_A$ or $—Si(R^8)—O-M^3 L^1_A$.

The skilled person is aware that the number (A) of possible ligands for $L^1_A$, $L^2_A$, $L^3_A$, $L^4_A$ results directly from the number of free valences of the metal atom used, where the valence number describes the valency of the metal.

In a further embodiment the metal-siloxane-silanol(ate) compound in the production of the polyurethane prepolymers of the invention has the general formula $(Y_{0.25} R^\# SiO_{1.25})_4 (Z_{0.75} Y_{0.25} XO)_4 (OQ)_2$, where each X independently of any other is selected from the group consisting of Si, $M^1$, $-M^3 L^1_A$, $M^3$, or $—Si(R^8)—O-M^3 L^1_A$, where $M^1$ and $M^3$ independently of one another are selected from the group consisting of s and p block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi; and where $L^1$ is selected from the group consisting of —OH and —O—(C1 to C10 alkyl), more particularly —O—(C1 to C8 alkyl) or —O—(C1 to C6 alkyl), or where $L^1$ is selected from the group consisting of —OH, —O-methyl, —O-ethyl, —O-propyl, —O-butyl, —O— octyl, —O-isopropyl, and —O-isobutyl, and where $R^8$ is selected from the group consisting of optionally substituted C1 to C20 alkyl, optionally substituted C3 to C6 cycloalkyl, optionally substituted C2 to C20 alkenyl and optionally substituted C6- to C10 aryl;

each Z independently of any other is selected from the group consisting of $L^2$, $R^5$, $R^6$ and $R^7$, where $L^2$ is selected from the group consisting of —OH and —O—(C1 to C10 alkyl), more particularly —O—(C1 to C8 alkyl) or —O—(C1 to C6 alkyl), or where $L^2$ is selected from the group consisting of —OH, —O-methyl, —O-ethyl, —O-propyl, —O-butyl, —O-octyl, —O-isopropyl, and —O— isobutyl;

each $R^\#$, $R^5$, $R^6$ and $R^7$ independently of any other is selected from the group consisting of optionally substituted C1 to C20 alkyl, optionally substituted C3 to C6 cycloalkyl, optionally substituted C2 to C20 alkenyl and optionally substituted C6 to C10 aryl;

each Y independently of any other is —O-$M^2$-$L^3_A$, or two Ys are taken together and together are —O-$M^2(L^3_A)$-O— or —O—, where $L^3$ is selected from the group consisting of —OH and —O—(C1 to C10 alkyl), more particularly —O—(C1 to C8 alkyl) or —O—(C1 to C6 alkyl), or where $L^3$ is selected from the group consisting of —OH, —O-methyl, —O-ethyl, —O-propyl, —O-butyl, —O-octyl, —O-isopropyl, and —O-isobutyl, and each $M^2$ independently of any other is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi;

each Q independently of any other is H, $M^4L^4_A$, —$SiR^8$, -$M^3L^1_A$, or in each case a single bond linked to $M^3$ of X or in each case a single bond linked to the Si atom of the radical —$Si(R^8)$—O-$M^3L^1_A$, where $M^3$, $R^8$ and $L^1$ are as defined for X, where $M^4$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi, and where $L^4$ is selected from the group consisting of —OH and —O—(C1 to C10 alkyl), more particularly —O—(C1 to C8 alkyl) or —O—(C1 to C6 alkyl), or where $L^4$ is selected from the group consisting of —OH, —O— methyl, —O-ethyl, —O-propyl, —O-butyl, —O-octyl, —O-isopropyl, and —O-isobutyl, with the proviso that at least one X is $M^3$, -$M^3L^1_A$ or —$Si(R^8)$—O-$M^3L^1_A$.

The metal-siloxane-silanol(ate) compound preferably has the general formula $Si_4O_9R^1R^2R^3R^4X^1X^2X^3X^4OQ^1OQ^2Y^1Y^2Z^1Z^2Z^3$, where $X^1$, $X^2$ and $X^3$ independently of one another are selected from Si or $M^1$, where $M^1$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi;

$Z^1$, $Z^2$ and $Z^3$ independently of one another are selected from the group consisting of $L^2$, $R^5$, $R^6$ and $R^7$, where $L^2$ is selected from the group consisting of —OH and —O—(C1 to C10 alkyl), more particularly —O—(C1 to C8 alkyl) or —O—(C1 to C6 alkyl), or where $L^2$ is selected from the group consisting of —OH, —O-methyl, —O-ethyl, —O-propyl, —O-butyl, —O-octyl, —O-isopropyl, and —O— isobutyl;

$R^1$, $R^2$, $R^3$, $R^4$, $R^5$, $R^6$ and $R^7$ independently of one another are selected from the group consisting of optionally substituted C1 to C20 alkyl, optionally substituted C3 to C8 cycloalkyl, optionally substituted C2 to C20 alkenyl and optionally substituted C5 to C10 aryl;

$Y^1$ and $Y^2$ independently of one another are —O-$M^2$-$L^{3,4}$, or $Y^1$ and $Y^2$ are taken together and together are —O-$M^2(L^3_A)$-O— or —O—, where $L^3$ is selected from the group consisting of —OH and —O—(C1 to C10 alkyl), more particularly —O—(C1 to C8 alkyl) or —O—(C1 to C6 alkyl), or where $L^3$ is selected from the group consisting of —OH, —O-methyl, —O-ethyl, —O-propyl, —O-butyl, —O-octyl, —O-isopropyl, and —O-isobutyl, and $M^2$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi; and $X^4$ is -$M^3L^1_A$ or $M^3$, and $Q^1$ and $Q^2$ are each H or a single bond linked to $M^3$, where $L^1$ is selected from the group consisting of —OH and —O—(C1 to C10 alkyl), more particularly —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $M^3$ is selected from the group consisting of s and p block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi;

or $X^4$ is -$M^3L^1_A$ and $Q^2$ is H or a single bond linked to $M^3$, and $Q^1$ is H, $M^4L^4_A$ or —$SiR^8$, where $M^4$ is selected from the group consisting of s and p block metals, d and f block transition metals, lanthanide and actinide metals, and semi-metals, more particularly from the group consisting of metals from transition groups 2., 3., 4., 5. and 8. and metals from main groups 1., 2., 3., 4. and 5., more particularly from the group consisting of Zn, Sc, Ti, Zr, Hf, V, Pt, Ga, Sn and Bi, where $L^4$ is selected from the group consisting of —OH and —O—(C1 to C10 alkyl), more particularly —O—(C1 to C8 alkyl) or —O—(C1 to C6 alkyl), or where $L^4$ is selected from the group consisting of —OH, —O-methyl, —O-ethyl, —O-propyl, —O-butyl, —O-octyl, —O-isopropyl, and —O— isobutyl, and where $R^8$ is selected from the group consisting of optionally substituted C1 to C20 alkyl, optionally substituted C3 to C8 cycloalkyl, optionally substituted C2 to C20 alkenyl and optionally substituted C5 to C10 aryl, or $X^4$, $Q^1$ and $Q^2$ independently of any other are -$M^3L^1_A$, or $X^4$ is —Si($R^8$)—O-$M^3L^1$, $Q^2$ is a single bond linked to the Si atom of $X^4$ and $Q^1$ is -$M^4L^4_A$, or $X^4$ is —Si($R^8$)—O-$M^3L^1_A$, $Q^2$ is a single bond linked to the Si atom of $X^4$, and $Q^1$ is a single bond linked to the $M^3$ atom of $X^4$.

In a further embodiment the metal-silsesquioxane in the production of the polyurethane prepolymers of the invention has the general formula $(X^4)(Z^1Y^1X^2O)(Z^2X^{10}{}_2)(Z^3X^3{}_2)(R^1Y^2SiO)(R^3SiO)(R^4SiO_2)(R^2SiO_2)(Q^1)(Q^2)$, where $X^1$, $X^2$ and $X^3$ independently of one another are selected from Si or $M^1$, where $M^1$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi;

$Z^1$, $Z^2$ and $Z^3$ independently of one another are selected from the group consisting of $L^2$, $R^5$, $R^6$ and $R^7$, where $L^2$ is selected from the group consisting of —OH and —O—(C1 to C10 alkyl), more particularly —O—(C1 to C8 alkyl) or —O—(C1 to C6 alkyl), or where $L^2$ is selected from the group consisting of —OH, —O-methyl, —O-ethyl, —O-propyl, —O-butyl, —O-octyl, —O-isopropyl, and —O— isobutyl;

$R^1$, $R^2$, $R^3$, $R^4$, $R^5$, $R^6$ and $R^7$ independently of one another are selected from the group consisting of optionally substituted C1 to C20 alkyl, optionally substituted C3 to C6 cycloalkyl, optionally substituted C2 to C20 alkenyl and optionally substituted C6 to C10 aryl;

$Y^1$ and $Y^2$ independently of one other are —O-$M^2$-$L^{3,4}$, or $Y^1$ and $Y^2$ are taken together and together are —O-$M^2$($L^3_A$)-O— or —O—, where $L^3$ is selected from the group consisting of —OH and —O—(C1 to C10 alkyl), more particularly —O—(C1 to C8 alkyl) or —O—(C1 to C6 alkyl), or where $L^3$ is selected from the group consisting of —OH, —O-methyl, —O-ethyl, —O-propyl, —O-butyl, —O-octyl, —O-isopropyl, and —O-isobutyl, and $M^2$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi; and $X^4$ is -$M^3L^1_A$ or $M^3$ and $Q^1$ and $Q^2$ are each H or a single bond linked to $M^3$, where $L^1$ is selected from the group consisting of —OH and —O—(C1 to C10 alkyl), more particularly —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $M^3$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi, or $X^4$ is -$M^3L^1_A$ and $Q^2$ is H or a single bond linked to $M^3$ and $Q^1$ is H, $M^4L^4_A$ or —Si$R^8$, where M4 is selected from the group consisting of s and p block metals, d and f block transition metals, lanthanide and actinide metals, and semi-metals, more particularly from the group consisting of metals from transition groups 2., 3., 4., 5. and 8. and metals from main groups 1., 2., 3., 4. and 5., more particularly from the group consisting of Zn, Sc, Ti, Zr, Hf, V, Pt, Ga, Sn and Bi, where $L^4$ is selected from the group consisting of —OH and —O—(C1 to C10 alkyl), more particularly —O—(C1 to C8 alkyl) or —O—(C1 to C6 alkyl), or where $L^4$ is selected from the group consisting of —OH, —O-methyl, —O-ethyl, —O-propyl, —O-butyl, —O-octyl, —O-isopropyl, and —O— isobutyl, and where $R^8$ is selected from the group consisting of optionally substituted C1 to C20 alkyl, optionally substituted C3 to C6 cycloalkyl, optionally substituted C2 to C20 alkenyl and optionally substituted C6 to C10 aryl, or $X^4$, $Q^1$ and $Q^2$ independently of any other are -$M^3L^1_A$, or $X^4$ is —Si($R^8$)—O-$M^3L^1_A$, $Q^2$ is a single bond linked to the Si atom of $X^4$ and $Q^1$ is -$M^4L^4_A$, or $X^4$ is —Si($R^8$)—O-$M^3L^1_A$, $Q^2$ is a single bond linked to the Si atom of $X^4$ and $Q^1$ is a single bond linked to the $M^3$ atom of $X^4$.

In a further sense of the invention the catalyst based on a metal-siloxane-silanol(ate) compound may be described by the structure (I),

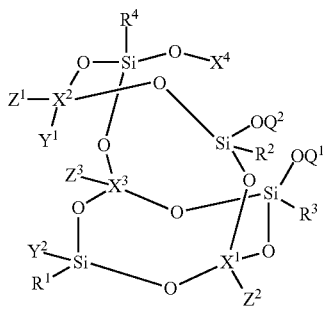

(I)

where
- $X^1$, $X^2$ and $X^3$ independently of one another are selected from Si or $M^1$, where $M^1$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi;
- $Z^1$, $Z^2$ and $Z^3$ independently of one another are selected from the group consisting of $L^2$, $R^5$, $R^6$ and $R^7$, where $L^2$ is selected from the group consisting of —OH and —O—(C1 to C10 alkyl), more particularly —O—(C1 to C8 alkyl) or —O—(C1 to C6 alkyl), or where $L^2$ is selected from the group consisting of —OH, —O-methyl, —O-ethyl, —O-propyl, —O-butyl, —O-octyl, —O-isopropyl and —O— isobutyl;
- $R^1$, $R^2$, $R^3$, $R^4$, $R^5$, $R^6$ and $R^7$ independently of one another are selected from the group consisting of optionally substituted C1 to C20 alkyl, optionally substituted C3 to C8 cycloalkyl, optionally substituted C2 to C20 alkenyl and optionally substituted C5 to C10 aryl;
- $Y^1$ and $Y^2$ independently of one another are —O-$M^2$-$L^3_A$, or $Y^1$ and $Y^2$ are taken together and together are —O-$M^2(L^3_A)$-O— or —O—, where $L^3$ is selected from the group consisting of —OH and —O—(C1 to C10 alkyl), more particularly —O—(C1 to C8 alkyl) or —O—(C1 to C6 alkyl), or where $L^3$ is selected from the group consisting of —OH, —O-methyl, —O-ethyl, —O-propyl, —O-butyl, —O-octyl, —O-isopropyl, and —O-isobutyl, and where $M^2$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi;
- and $X^4$ is -$M^3L^1_A$ or $M^3$ and $Q^1$ and $Q^2$ are H or in each case a single bond linked to $M^3$, where $L^1$ is selected from the group consisting of —OH and —O—(C1 to C10 alkyl), more particularly —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $M^3$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi, or
- $X^4$ is -$M^3L^1_A$ and $Q^2$ is H or a single bond linked to $M^3$, and $Q^1$ is H, $M^4L^4_A$ or —$SiR^8$, where $M^4$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi; and where $L^4$ is selected from the group consisting of —OH and —O—(C1 to C10 alkyl), more particularly —O—(C1 to C8 alkyl) or —O—(C1 to C6 alkyl), or where $L^4$ is selected from the group consisting of —OH, —O-methyl, —O-ethyl, —O-propyl, —O-butyl, —O-octyl, —O-isopropyl, and —O-isobutyl, and where $R^8$ is selected from the group consisting of optionally substituted C1 to C20 alkyl, optionally substituted C3 to C6 cycloalkyl, optionally substituted C2 to C20 alkenyl and optionally substituted C5 to C10 aryl, or
- $X^4$, $Q^1$ and $Q^2$ independently of one another are -$M^3L^1_A$, or
- $X^4$ is —Si($R^8$)—O-$M^3L^1_A$, $Q^2$ is a single bond linked to the Si atom of $X^4$, and $Q^1$ is -$M^4L^4_A$, or
- $X^4$ is —Si($R^8$)—O-$M^3L^1_A$, $Q^2$ is a single bond linked to the Si atom of $X^4$, and $Q^1$ is a single bond linked to the $M^3$ atom of $X^4$.

In a further preferred embodiment the metal-siloxane-silanol(ate) compound in the production of the polyurethane prepolymers of the invention has the general formula (I), where $X^1$, $X^2$ and $X^3$ independently of one other are Si,
- $X^4$ is -$M^3L^1_A$ and $Q^1$ and $Q^2$ are each a single bond linked to $M^3$, where $L^1$ is selected from the group consisting of —OH and —O—(C1 to C10 alkyl), more particularly —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $M^3$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi;
- $Z^1$, $Z^2$ and $Z^3$ each independently of any other are selected from optionally substituted C1 to C20 alkyl, optionally substituted C3 to C8 cycloalkyl, optionally substituted C2 to C20 alkenyl and optionally substituted C5 to C10 aryl, R¹, R² and R³ each independently of any other are selected from optionally substituted C1 to C20 alkyl, optionally substituted C3 to C8 cycloalkyl, optionally substituted C2 to C20 alkenyl and optionally substituted C5 to C10 aryl, Y¹ and Y² are taken together and together form —O—.

In one embodiment, depending on the equivalents of metal present, the metal-siloxane-silanol(ate) compound of formula (I) may take the mononuclear form of a monomer or polynuclear forms of a dimer (dinuclear), trimer (trinuclear), multimer (multinuclear) and/or mixtures thereof, and so, for example, structures of the formulae (Ia) to (Id) are possible.

Further polynuclear metal-siloxane-silanol (ate) compounds which can be used in the invention are the structures (Ia), (Ib), (Ic) or (Id),

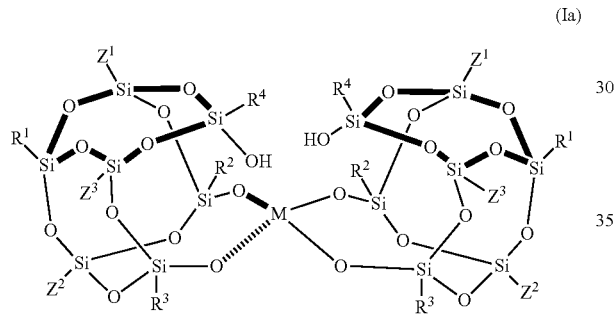
(Ia)

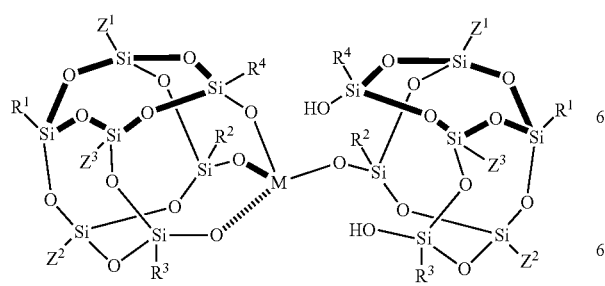
(Ib)

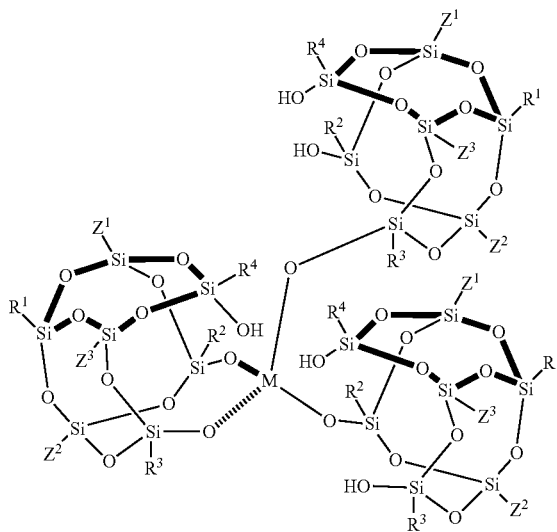
(Ic)

where

M is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4, and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi; and each R (R¹ to R⁴) independently of any other is selected from the group consisting of optionally substituted C1 to C20 alkyl, optionally substituted C3 to C8 cycloalkyl, optionally substituted C2 to C20 alkenyl, optionally substituted C5 to C10 aryl, —OH and —O—(C1 to C10 alkyl). The tetravalent metal M here is a common part of a plurality of cages. The skilled person is aware here that the number of bonds to the metal M is dependent on the valency of the metal M. The structural formulae (Ia) to (Ic) should be adapted correspondingly where applicable.

In one embodiment the polyurethane prepolymers of the invention are produced using a mixture of the metal-siloxane-silanol(ate) compounds of formula (I), (Ia), (Ib) and (Ic).

Furthermore, the polynuclear metal-siloxane-silanol (ate) compound of formula (Id) may have metal centres with six-fold coordination, giving rise to the possibility of structures of formula

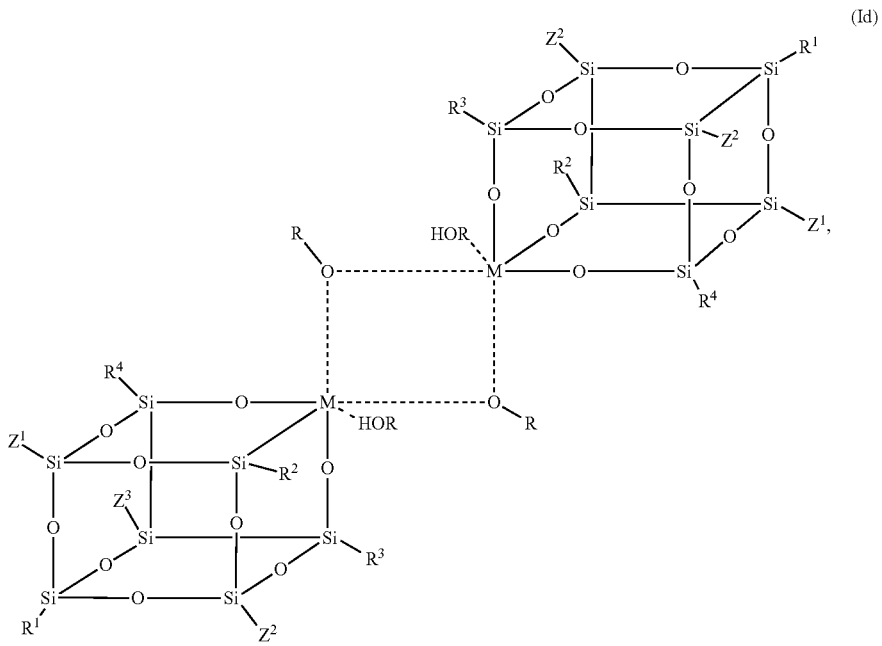

(Id)

where each M independently is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4, and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi; and each R independently of any other is selected from the group consisting of optionally substituted C1 to C20 alkyl, optionally substituted C3 to C8 cycloalkyl, optionally substituted C2 to C20 alkenyl, optionally substituted C5 to C10 aryl, —OH and —O—(C1 to C10 alkyl).

For the purposes of the invention, the term "mononuclear" describes the isolated cage structure, hence present in singular form, of the catalyst of the invention based on a metal-siloxane-silanol(ate) compound. Mononuclear catalysts based on a metal-siloxane-silanol(ate) compound may be encompassed by the structure (IV) and also, likewise, by the structures (I) and (II).

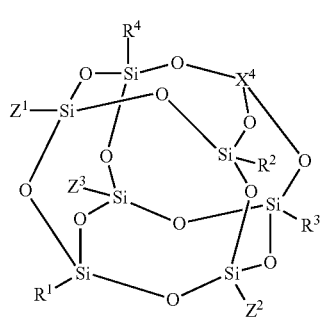

(II)

where
X$^4$ is -M$^3$L$^1$$_A$, where L$^1$ is selected from the group consisting of —OH and —O—(C1 to C10 alkyl), more particularly —O—(C1 to C8 alkyl) or —O—(C1 to C6 alkyl), or where L$^1$ is selected from the group consisting of —OH, —O-methyl, —O-ethyl, —O-propyl, —O-butyl, —O-octyl, —O-isopropyl, and —O-isobutyl, and where M$^3$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi;

Z$^1$, Z$^2$ and Z$^3$ independently of one another are selected from the group consisting of optionally substituted C1 to C20 alkyl, optionally substituted C3 to C8 cycloalkyl, optionally substituted C2 to C20 alkenyl and optionally substituted C5 to C10 aryl;

R$^1$, R$^2$, R$^3$ and R$^4$ each independently of one another are selected from the group consisting of optionally substituted C1 to C20 alkyl, optionally substituted C3 to C8 cycloalkyl, optionally substituted C2 to C20 alkenyl and optionally substituted C5 to C10 aryl.

Additionally, metal-silsesquioxanes used for producing the polyurethane prepolymers of the invention are metal-siloxane-silanol(ate) compounds of the general structural formula (II), where X$^4$ is -M$^3$L$^1$$_A$, where L$^1$ is selected from the group consisting of —OH and —O—(C1 to C10 alkyl), more particularly —O—(C1 to C8 alkyl) or —O—(C1 to C6 alkyl), or where L$^1$ is selected from the group consisting of —OH, —O-methyl, —O-ethyl, —O-propyl, —O-butyl, —O-octyl, —O-isopropyl, and —O-isobutyl, and where M$^3$ is selected from the group consisting of s and p block metals, d and f block transition metals, lanthanide and actinide metals, and semi-metals, more particularly from the group consisting of metals from transition groups 1., 2., 3., 4., 5., 8., 10. and 11. and metals from main groups 1., 2., 3., 4. and 5., preferably from the group consisting of Na, Zn, Sc, Nd, Ti, Zr, Hf, V, Fe, Pt, Cu, Ga, Sn and Bi; more particularly preferably from the group consisting of Zn, Ti, Zr, Hf, V, Fe, Sn and Bi;

- $Z^1$, $Z^2$ and $Z^3$ independently of one another are selected from the group consisting of $L^2$, $R^5$, $R^6$ and $R^7$, where $L^2$ is selected from the group consisting of —OH and —O—(C1 to C10 alkyl), more particularly —O—(C1 to C8 alkyl) or —O—(C1 to C6 alkyl), or where $L^2$ is selected from the group consisting of —OH, —O-methyl, —O-ethyl, —O-propyl, —O-butyl, —O-octyl, —O-isopropyl, and —O— isobutyl, and

- $R^1$, $R^2$, $R^3$, $R^4$, $R^5$, $R^6$ and $R^7$ independently of one another are selected from the group consisting of optionally substituted C1 to C20 alkyl, optionally substituted C3 to C8 cycloalkyl, optionally substituted C2 to C20 alkenyl and optionally substituted C5 to C10 aryl.

In one particularly advantageous embodiment the polyurethane prepolymers of the invention may have been produced by a catalyzed reaction with heptaisobutyl POSS-titanium(IV) ethoxide (TiPOSS) as a metal-siloxane-silanol(ate) compound.

In this case the abbreviation "TiPOSS" represents the mononuclear titanium-metallized silsesquioxane of the structural formula (IV) and may be used equivalently to "heptaisobutyl POSS-titanium(IV) ethoxide" for the purposes of the invention.

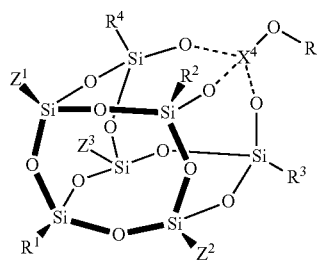
(IV)

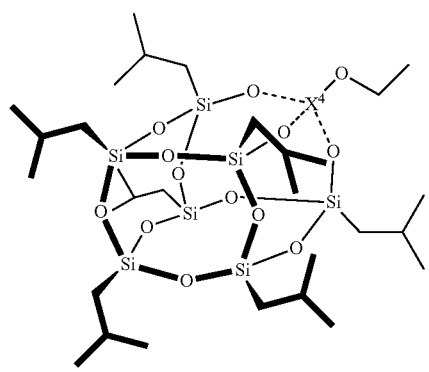
(IVb)

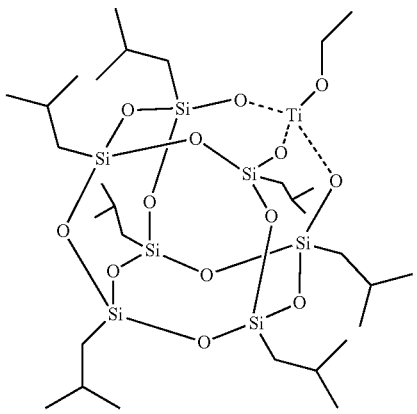
(IVc)

In the reaction for producing the polyurethane prepolymers of the invention, the metal-siloxane-silanol(ate) compound may preferably represent a mixture comprising the structures (I), (Ia), (Ib), (Ic), (Id), (II), (IV), (IVb), (IVc).

In one preferred embodiment the metal in the metal-siloxane-silanol(ate) compound is a titanium.

Particularly preferred catalysts from the group of the metal-siloxane-silanol(ate) compounds are heptaisobutyl POSS-titanium(IV) ethoxide (TiPOSS) and heptaisobutyl POSS-tin(IV) ethoxide (SnPOSS). Very particular preference is given to heptaisobutyl POSS-titanium(IV) ethoxide (TiPOSS).

Organometallic compounds with catalyst suitability are organotin, organobismuth, organozinc, organozirconium, organoaluminium or organotitanium compounds. Likewise suitable as catalyst are tertiary amines.

Suitable organometallic compounds are, for example, tetraalkyl titanates, such as tetramethyl titanate, tetraethyl titanate, tetra-n-propyl titanate, tetraisopropyl titanate, tetra-n-butyl titanate, tetraisobutyl titanate, tetra-sec-butyl titanate, tetraoctyl titanate, tetra-(2-ethylhexyl) titanate, dialkyl titanates ($(RO)_2TiO_2$, in which R, for example, is isopropyl, n-butyl or isobutyl), such as isopropyl n-butyl titanate; titanium acetylacetonate chelates, such as diisopropoxy-bis(acetylacetonate) titanate, diisopropoxy-bis(ethylacetylacetonate) titanate, di-n-butyl-bis(acetylacetonate) titanate, di-n-butyl-bis(ethylacetoacetate) titanate, triisopropoxide-bis(acetylacetonate) titanate, zirconium tetraalkoxides, such as zirconium tetraethoxide, zirconium tetrabutoxide, zirconium tetrabutyrate, zirconium tetrapropoxide, zirconium carboxylates, such as zirconium diacetate; zirconium acetylacetonate chelates, such as zirconium tetra(acetylacetonate), tributoxyzirconium acetylacetonate, dibutoxyzirconium (bisacetylacetonate), aluminium trisalkoxides, such as aluminium triisopropoxide, aluminium trisbutoxide; aluminium acetylacetonate chelates, such as aluminium tris(acetylacetonate) and aluminium tris(ethylacetylacetonate), organotin compounds such as dibutyltin dilaurate (DBTL), dibutyltin maleate, dibutyltin diacetate, tin(II) 2-ethylhexanoate (tin octoate), tin naphthenate, dimethyltin dineodecanoate, dioctyltin dineodecanoate, dimethyltin dioleate, dioctyltin dilaurate, dimethyl mercaptides, dibutyl mercaptides, dioctyl mercaptides, dibutyltin dithioglycolate, dioctyltin glycolate, dimethyltin glycolates, a solution of dibutyltin oxide, reaction products of zinc salts and organic carboxylic acids (carboxylates) such as zinc(II) 2-ethylhexanoate or zinc(II) neodecanoate, mixtures of bismuth carboxylates and zinc carboxylates, reaction products of bismuth salts and organic carboxylic acids such as bismuth(III) tris(2-ethylhexonate) and bismuth(III) tris(neodecanoate) and also bismuth complex compounds, organolead compounds such as lead octoxide, organovanadium compounds.

Suitable amine compounds are, for example, butylamine, octylamine, dibutylamine, monoethanolamine, diethanolamine, triethanolamine, diethylenetriamine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicylo[5.4.0]undec-7-ene (DBU), salts of these amines with carboxylic acids or other acids, or mixtures thereof.

Preference is given to organotin or organotitanium compounds.

Preferred organometallic compounds as catalysts are dibutyltin and dioctyltin diacetate, maleate, bis(2-ethylhexoate), dilaurate, dichloride and bisdodecylmercaptide, tributyltin acetate, bis(β-methoxycarbonylethyl)tin dilaurate and bis(β-acetylethyl)tin dilaurate.

Particularly preferred organometallic compounds as catalysts are selected from the group consisting of dibutyltin dilaurate (DBTL), tin(II) 2-ethylhexanoate (tinoctoate), zinc (II) 2-ethylhexanoate, zinc(II) neodecanoate, bismuth(III) tris(2-ethylhexonate), bismuth(III) tris(neodecanoate) or mixtures thereof.

Very particular preference is given to dibutyltin dilaurate (DBTL).

In a further embodiment the catalysts are selected from groups A and/or B, with the catalyst A being selected from the group of the metal-siloxane-silanol(ate) compounds and the catalyst B being a metal-organic catalyst or an amine catalyst.

Preferably the catalyst A and/or B is an organotin or organotitanium compound. The catalyst B is very preferably selected from the group of tin(IV) compounds.

In the production of the polyurethane prepolymers of the invention, the total amount of catalyst is between 1.0 and 1000 ppm, preferably between 2 and 250 ppm, more preferably between 3 and 100 ppm, based on the total weight of the hydroxy-functionalized polymer used.

In one preferred embodiment, in the production of the polyurethane prepolymers of the invention, when using a catalyst from group A, a reaction temperature between 10° C. and 120° C., preferably between 15° C. to 100° C., more preferably between 20° C. and 90° C. and very preferably between 25° C. and 85° C. is employed.

In another preferred embodiment, in the production of the polyurethane prepolymers of the invention, when using a catalyst from group A, the amount of the catalyst A selected is between 1 ppm and 500 ppm, preferably between 2 ppm and 250 ppm, more preferably between 3 ppm and 80 ppm.

In another preferred embodiment, when producing the polyurethane prepolymers of the invention, heptaisobutyl POSS-titanium(IV) ethoxide (TiPOSS) is used as catalyst A.

In one particularly preferred embodiment, in the production of the polyurethane prepolymers of the invention, when using a catalyst from group A, a reaction temperature of 10° C. to 120° C., preferably of 15° C. to 100° C., more preferably of 20° C. to 90° C. and very preferably between 25° C. and 85° C. is employed and an amount of catalyst A of between 1.0 ppm and 500 ppm, preferably between 2 ppm and 250 ppm, more preferably between 3 ppm and 80 ppm is selected.

In a likewise particularly preferred embodiment, in the production of the polyurethane prepolymers of the invention, when using heptaisobutyl POSS-titanium(IV) ethoxide (TiPOSS) as catalyst from group A, a reaction temperature of 10° C. to 120° C., preferably of 15° C. to 100° C., more preferably of 20° C. to 90° C. and very preferably of 25° C. to 85° C. is employed.

In a likewise particularly preferred embodiment, in the production of the polyurethane prepolymers of the invention, when using heptaisobutyl POSS-titanium(IV) ethoxide (TiPOSS) as catalyst from group A, the amount of the catalyst A selected is between 1 ppm and 1000 ppm, preferably between 2 ppm and 250 ppm and more preferably between 3 ppm and 100 ppm.

In an especially preferred embodiment, in the production of the polyurethane prepolymers of the invention, when using heptaisobutyl POSS-titanium(IV) ethoxide (TiPOSS) as catalyst from the group A, a reaction temperature of 10° C. to 120° C., preferably of 15° C. to 100° C., more preferably of 20° C. to 90° C. and more preferably 25° C. to 85° C. is employed and the amount of catalyst A is between 1 ppm and 500 ppm, preferably between 2 ppm and 250 ppm, more preferably between 3 ppm and 80 ppm.

In a further preferred embodiment, in the production of the polyurethane prepolymers of the invention, when using a catalyst from group B, a reaction temperature of 20° C. to 80° C., preferably of 20° C. to 70° C., more preferably of 25° C. to 50° C. is employed.

In a further preferred embodiment, in the production of the polyurethane prepolymers of the invention, when using a catalyst from group B, the amount of the catalyst B selected is between 1 ppm and 1000 ppm, preferably between 2 ppm and 250 ppm, more preferably between 3 ppm and 100 ppm.

In one particularly preferred embodiment, in the production of the polyurethane prepolymers of the invention, when using a catalyst from group B, a reaction temperature of 20° C. to 80° C. and preferably of 20° C. to 70° C., more preferably of 25° C. to 50° C. is employed and the amount of the catalyst B selected is between 1 ppm and 1000 ppm, preferably between 2 ppm and 250 ppm, more preferably between 3 ppm and 100 ppm.

In another preferred embodiment, when producing the polyurethane prepolymers of the invention, dibutyltin dilaurate (DBTL) is used as a catalyst.

In a likewise particularly preferred embodiment, in the production of the polyurethane prepolymers of the invention, when using dibutyltin dilaurate (DBTL) as catalyst B, a reaction temperature of 20° C. to 70° C., preferably of 25° C. to 50° C. is employed.

In a likewise particularly preferred embodiment, in the production of the polyurethane prepolymers of the invention, when using dibutyltin dilaurate (DBTL) as catalyst B, the amount of the catalyst B selected is between 20 ppm and 100 ppm, preferably between 30 ppm and 85 ppm, more preferably between 40 ppm and 50 ppm.

In one especially preferred embodiment, in the production of the polyurethane prepolymers of the invention, when using dibutyltin dilaurate (DBTL) as catalyst B, a reaction temperature of 20° C. to 70° C., preferably of 25° C. to 50° C., is employed and the amount of the catalyst B selected is between 20 ppm and 100 ppm, preferably between 30 ppm and 85 ppm, more preferably between 40 ppm and 50 ppm.

Furthermore, the polyurethane prepolymers of the invention serve as building blocks for producing polyurethane elastomers, polyurethane ureas, one- or two-component reactive polyurethane systems, polyurethane dispersions, which find broad use as polyurethane foams, construction materials, varnishes, coatings, adhesives and sealants, grouts, films, PUR elastomers, etc. The polyurethane prepolymers of the invention likewise serve as a building block for the targeted production of block copolymers, star polymers or dendrimers.

The isocyanate-functional polyurethane prepolymers of the invention may be used as crosslinking constituents directly, without further reaction or work-up, in reactive PU compositions, for example in aqueous 1K (one-component) or 2K (two-component) PU compositions.

Aqueous 1K PU dispersions are OH- and/or NH-functional dispersions in combination with raw materials containing thermally reversibly blocked isocyanate groups. The blocked polyisocyanates in question here may be used in unmodified form, for example, in other words in their hydrophobic form, in which case the resin dispersion (OH- and/or NH-terminated) must have a co-dispersing function. Conversely, hydrophilically modified blocked polyisocyanates form stable dispersions themselves, and are admixed to the resin dispersion. Alternatively the blocked isocyanate function may be bonded directly to the OH- and/or NH-terminated polymer scaffold. Such systems are known as self-crosslinking dispersions.

Aqueous 2K PU dispersions consist of a binder component and a crosslinker component, which are produced and stored separately from one another and are not combined until shortly before application. The working time or pot life (that is, the time in which the coating composition of the invention can be processed, preferably at room temperature (15 to 25° C., more particularly 20° C.) without, for example, corresponding crosslinking reactions causing the viscosity at room temperature to increase so sharply that application is no longer possible) is known to be dependent on the constituents used.

In one preferred embodiment of the present invention the polyurethane prepolymers of the invention are reacted further in a further step with a silane to give silylated polyurethanes.

Also a subject of the present invention are silylated polyurethanes obtainable by reacting the polyurethane prepolymers of the invention with organosilanes.

The silylated polyurethanes obtainable in this way, and also compositions comprising the silylated polyurethanes, are a further subject of the present invention.

The silylated polyurethanes produced from at least one polyurethane prepolymer of the invention likewise have corresponding area ratios from the molar mass distribution (measured by GPC).

The term "silane" or "organosilane" refers to compounds which on the one hand have at least one, typically two or three, hydrolysable groups, preferably alkoxy groups or acyloxy groups, bonded directly via Si—O bonds to the silicon atom, and on the other hand have at least one organic radical bonded directly via an Si—C bond to the silicon atom. Silanes having alkoxy groups or acyloxy groups are also known to the skilled person as organoalkoxysilanes or organocyloxysilanes, respectively.

Correspondingly, the term "silane group" denotes the silicon-containing group bonded to the organic radical of the silane, this radical being bonded via the Si—C bond. The silanes, or their silane groups, have the property of hydrolysing on contact with moisture. The compounds formed are organosilanols, i.e. organosilicon compounds containing one or more silanol groups (Si—OH groups) and, by subsequent condensation reactions, organosiloxanes, these being organosilicon compounds containing one or more siloxane groups (Si—O—Si groups).

Suitable silanes in the sense of the invention comprise at least one group that is reactive towards isocyanate groups.

This reaction is carried out preferably in a stoichiometric ratio of the isocyanate groups to the groups reactive towards isocyanate groups of 1:1, or with a slight excess of groups reactive towards isocyanate groups, and so the resulting silane-functional polyurethane polymer is free of isocyanate groups.

In the reaction of the silane containing at least one group reactive towards isocyanate groups with a polyurethane polymer containing isocyanate groups, the silane can in principle, although not preferably, be used at less than stoichiometry, to produce a silane-functional polymer which contains not only silane groups but also isocyanate groups. The remaining NCO groups can be quenched with compounds which contain a nucleophilic group (OH, SH, NH2, NHR), such as 2-ethylhexyl alcohol, dibutylamine, benzyl alcohol and stearylamine, for example.

A silane which contains at least one group reactive towards isocyanate groups is, for example, a mercaptosilane or an aminosilane.

In the sense of the invention, "silylated polyurethanes" are silane-modified, silane-functional or silane-terminated polyurethanes, which are also referred to interchangeably as SPUR. The definition includes products of chain polymerization, polycondensation or polyaddition.

The polymers in question, furthermore, are moisture-crosslinking polymers, which are able to cure under the influence of water, either by addition or mixture constituents of/with water or by being brought into contact with atmospheric moisture, and preferably with additional use of a catalyst.

"Polymers" are chemical compounds composed of chain or branched molecules (macromolecules) which in turn consist of a number of identical/similar or else different units, called the monomers. Polymers also include oligomers. Oligomers are polymers having a relatively small number of units. Unless expressly defined otherwise, oligomers are included in the concept of polymers in accordance with the invention. Polymers may occur as homopolymers (=consisting only of one monomer unit), copolymers (=consisting of two or more monomer units) or as a polymer mixture (=polymer alloy, polymer blends, i.e. mixtures of different polymers and copolymers).

Silane-functional polymers are also referred to as hybrid polymers in general use and in the invention. These polymers can combine the curing chemistry of alkoxysilane groups with the chemistry of the polyols and/or polyurethanes. Alkoxysilane groups are known from silicone chemistry; the isocyanate-functional polymers, especially hydroxy-functional polymers, contribute at least parts of the polymer backbone of the hybrid polymer. Crosslinking ("curing") takes place via the reactive silane end groups through ingress of atmospheric moisture, for example. The curing mechanism of these systems is preferably neutral.

"Alkoxy" refers to an alkyl group which is connected via an oxygen atom to the main carbon chain or the main skeleton of the compound.

Silane-functional polyurethanes comprise a polymer backbone (P) and also at least two end groups or functional groups, or modifications, of the following general formula (V)

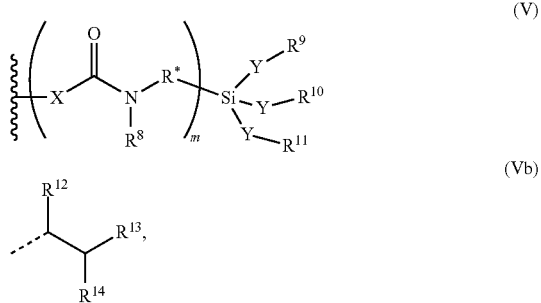

where
- X is C, Si or a heteroatom and these, according to their valency, optionally have one or more radicals $R^8$, is preferably C, N, O, P or S, more preferably C, N or O, very preferably N or O, and is bonded in each case to a carbon in the polymer backbone,
- R* is O or an optionally substituted, straight-chain or branched C1 to C25 alkyl group or an optionally substituted C4 to C18 cycloalkyl group or an optionally substituted C4 to C18 aryl group and if R*=O, the Si atom is connected directly to the N atom,
- each Y independently of any other is either O or a direct bond of the Si atom to the respective radical $R^9$, $R^{10}$ or $R^{11}$, and preferably at least one Y is O,
- $R^8$ is H, an optionally substituted, straight-chain or branched C1 to C25 alkyl group, an optionally substituted, straight-chain or branched C2 to C125 alkenyl group or an optionally substituted, straight-chain or branched C2 to C18 alkynyl group, an optionally substituted C4 to C18 cycloalkyl group or an optionally substituted C4 to C18 aryl group, or is a radical of the general structure (Vb),
- $R^{12}$ and $R^{14}$ each independently of one another are H or a radical from the group consisting of —$R^{15}$, —COO$R^{15}$ and —CN,
- $R^{13}$ is H or is a radical from the group consisting of —CH$_2$—COO$R^{15}$, —COO$R^{15}$, —CONH$R^{15}$, —CON($R^{15}$), —CN, —NO$_2$, —PO(O$R^{15}$)$_2$, —SO$R^{15}$ and —SO$_2$O$R^{15}$,
- $R^{15}$ is a hydrocarbon radical having 1 to 20 C atoms and optionally containing at least one heteroatom,
- $R^9$, $R^{10}$ and $R^{11}$ independently of one another are H, an optionally substituted, straight-chain or branched C1 to C20 alkyl group, an optionally substituted, straight-chain or branched C2 to C20 alkenyl group or an optionally substituted C4 to C14 cycloalkyl group or an optionally substituted C4 to C14 aryl group;
- preferably at least $R^9$ is a C2 alkyl group, more preferably at least $R^9$ and $R^{10}$ are each a C2 alkyl group, and
- m is 0 or 1 and if m=0, the Si atom is bonded directly to a carbon in the polymer backbone (P).

In an alternative embodiment the polyurethane prepolymers of the invention may be reacted with an organosilane of the formula (IX)

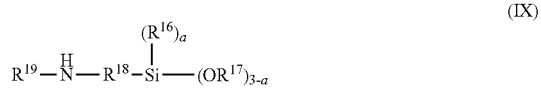

in which the two radicals $R^{16}$ and $R^{17}$ are each independent of one another and the radical $R^{16}$ is a linear or branched, monovalent hydrocarbon radical having 1 to 8 C atoms, more particularly a methyl or ethyl group,
the radical $R^{17}$ is an acyl radical or a linear or branched, monovalent hydrocarbon radical having 1 to 5 C atoms, more particularly a methyl or ethyl group, preferably a methyl group, the index a is 0 or 1 or 2, more particularly 0, and
the radical $R^{18}$ is a linear or branched, divalent hydrocarbon radical having 1 to 12 C atoms, which optionally comprises cyclic moieties and optionally one or more heteroatoms, more particularly one or more nitrogen atoms, and more particularly is an alkylene group having 1 to 6 C atoms, preferably 2 to 6 C atoms, more particularly a propylene group.

Within one silane group of the formula (IX), $R^{16}$ and $R^{17}$ each independently of one other are the radicals described. Also possible, for example, are compounds having end groups of the formula (IX) which are ethoxydimethoxysilane end groups ($R^{16}$=methyl, $R^{17}$=methyl, $R^{17}$=ethyl).

$R^{19}$ is a hydrogen atom or a cyclic, linear or branched, monovalent hydrocarbon radical having 1 to 20 C atoms, which optionally comprises cyclic moieties, or is a radical of the following formula:

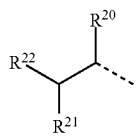

in which the radicals $R^{20}$ and $R^{21}$ in each case independently of one other are a hydrogen atom or a radical from the group consisting of —$R^{23}$, —COO$R^{23}$ and —CN, the radical $R^{22}$ is a hydrogen atom or a radical from the group consisting of —CH$_2$—COOR*, —COO$R^{23}$, —CONH$R^{23}$, —CON($R^{23}$)$_2$, —CN, —NO$_2$, —PO(O$R^{23}$)$_2$, —SO$_2$$R^{23}$ and —SO$_2$O$R^{23}$, and the radical $R^{23}$ is a hydrocarbon radical having 1 to 20 C atoms and optionally containing at least one heteroatom.

$R^{19}$ may also be a hydrocarbon radical containing alkoxysilyl groups, such as a trimethoxysilylpropyl radical, for example.

Examples of aminosilanes suitable in the invention are primary aminosilanes, preferably 3-aminopropyltrimethoxysilane, 3-aminopropyldimethoxymethylsilane; secondary aminosilanes, preferably N-butyl-3-aminopropyltrimethoxysilane, N-phenyl-3-aminopropyltrimethoxysilane; the products of the Michael-like addition of primary aminosilanes, such as the products of 3-aminopropyltrimethoxysilane or 3-aminopropyldimethoxymethylsilane, with Michael acceptors such as acrylonitrile, acrylic esters, (meth)acrylic esters, (meth)acrylamides, maleic and fumaric diesters, citraconic diesters and itaconic diesters, preferably dimethyl and diethyl N-(3-trimethoxysilylpropyl)aminosuccinate.

Michael acceptors are compounds which contain double bonds activated by electron acceptor radicals and which are therefore able to enter into nucleophilic addition reactions with primary amino groups (NH$_2$ groups) in a manner analogous to the Michael addition (hetero-Michael addition).

Particularly suitable aminosilanes are secondary aminosilanes, especially aminosilanes in which $R^{19}$ in formula (IX)

is other than H. Preference is given to N-alkylaminosilanes such as N-butyl-3-aminopropyltrimethoxysilane, bis[3-(trimethoxysilyl)propyl]amines, [(N-cyclohexylamino)methyl]methyldiethoxysilane, N-ethylaminomethyldiethoxysilane, N-butyl-3-amino-2-methylpropyltrimethoxysilanes, N-ethyl-4-amino-3,3-dimethylbutyldimethoxymethylsilanes and N-ethyl-4-amino-3,3-dimethylbutyltrimethoxysilanes.

Suitable mercaptosilanes have the general formula (X):

$$HS-R^{18}-(SiR^{16}{}_a(OR^{17})_{3-a}) \quad (X)$$

where the radicals $R^{16}$ to $R^{18}$ are as defined above.

Examples include 3-mercaptopropyltrimethoxysilane and 1-mercaptomethylmethyldimethoxysilane.

It is also possible to use mixtures of the above-stated silanes of the formula (VIII) and formula (IX) and also of the mercaptosilanes (X) for the end capping reaction.

In a further embodiment, suitable organosilanes are those which comprise all reaction products of the Michael-like addition of primary aminosilanes such as 3-aminopropyltrimethoxysilane or 3-aminopropyldimethoxymethylsilane with Michael acceptors such as acrylonitrile, acrylic esters, (meth)acrylic esters, (met)acrylamides, maleic and fumaric diesters, citraconic diesters, itaconic diesters, and mixtures thereof.

Unless otherwise indicated, N denotes nitrogen in particular. In addition, O denotes oxygen in particular, unless otherwise indicated. S denotes sulfur in particular, unless otherwise indicated. P denotes phosphorus in particular, unless otherwise indicated. C denotes carbon in particular, unless otherwise indicated. H denotes hydrogen in particular, unless otherwise indicated. Si denotes silicon in particular, unless otherwise indicated.

"Optionally substituted" means that in the corresponding group or radical hydrogen atoms may have been replaced by substituents. Substituents may in particular be selected from the group consisting of C1 to C4 alkyl, methyl-, ethyl-, propyl-, butyl-, phenyl-, benzyl-, halo-, fluoro-, chloro-, bromo-, iodo-, hydroxyl-, amino-, alkylamino-, dialkylamino-, C1 to C4 alkoxy-, phenoxy-, benzyloxy-, cyano-, nitro-, and thio-. If a group is said to be optionally substituted, it is possible for 0 to 50, more particularly 0 to 20, hydrogen atoms in the group to have been replaced by substituents. If a group is substituted, at least one hydrogen atom is replaced by a substituent.

The term "alkyl group" refers to a saturated hydrocarbon chain. Alkyl groups more particularly have the general formula $-C_nH_{2n+1}$. The designation "C1 to C16 alkyl group" denotes in particular a saturated hydrocarbon chain having 1 to 16 carbon atoms in the chain. Examples of C1 to C16 alkyl groups are methyl, ethyl, propyl, butyl, isopropyl, isobutyl, sec-butyl, tert-butyl, n-pentyl and ethylhexyl. Correspondingly, a "C1 to C8 alkyl group" denotes in particular a saturated hydrocarbon chain having 1 to 8 carbon atoms in the chain. Alkyl groups may in particular also be substituted, even if this is not specifically indicated.

"Straight-chain alkyl groups" denote alkyl groups which contain no branches. Examples of straight-chain alkyl groups are methyl, ethyl, n-propyl, n-butyl, n-pentyl, n-hexyl, n-heptyl and n-octyl.

"Branched alkyl groups" denote alkyl groups which are not straight-chain, and hence in which, in particular, the hydrocarbon chain exhibits forking. Examples of branched alkyl groups are isopropyl, isobutyl, sec-butyl, tert-butyl, sec-pentyl, 3-pentyl, 2-methylbutyl, isopentyl, 3-methylbut-2-yl, 2-methylbut-2-yl, neopentyl, ethylhexyl and 2-ethylhexyl.

"Alkenyl groups" denote hydrocarbon chains which contain at least one double bond along the chain. An alkenyl group having one double bond, for example, has the general formula $-C_nH_{2n-1}$ in particular. Alkenyl groups, however, may also have more than one double bond. The designation "C2 to C16 alkenyl group" denotes in particular a hydrocarbon chain having 2 to 16 carbon atoms in the chain. The number of hydrogen atoms varies according to the number of double bonds in the alkenyl group. Examples of alkenyl groups are vinyl, allyl, 2-butenyl and 2-hexenyl.

"Straight-chain alkenyl groups" denote alkenyl groups which contain no branches. Examples of straight-chain alkenyl groups are vinyl, allyl, n-2-butenyl and n-2-hexenyl.

"Branched alkenyl groups" denote alkenyl groups which are not straight-chain, and in which, therefore, the hydrocarbon chain has forking in particular. Examples of branched alkenyl groups are 2-methyl-2-propenyl, 2-methyl-2-butenyl and 2-ethyl-2-pentenyl.

"Aryl groups" denote monocyclic (e.g. phenyl), bicyclic (e.g. indenyl, naphthalenyl, tetrahydronaphthyl, or tetrahydroindenyl) and tricyclic (e.g. fluorenyl, tetrahydrofluorenyl, anthracenyl or tetrahydroanthracenyl) ring systems in which the monocyclic ring system, or at least one of the rings in a bicyclic or tricyclic ring system, is aromatic. A C4 to C14 aryl group in particular denotes an aryl group having 4 to 14 carbon atoms. Aryl groups may in particular also be substituted, even if this is not specifically indicated.

In the sense of the invention, "silanols" are organic silicon compounds in which at least one hydroxyl group (OH) is bonded to the silicon atom (—Si—OH).

In the sense of the invention, "silanolates" are organic silicon compounds in which at least one deprotonated hydroxyl function (R—O—) is bonded to the silicon atom (—Si—O—), and this negatively charged oxygen atom may also be coordinated and/or bonded covalently, chemically, to other compounds, such as metals, for example.

In the invention the silylated polyurethanes are produced by a catalyzed synthesis of at least one isocyanate-reactive compound, more particularly a hydroxy-functionalized polymer, and a compound containing at least one isocyanate group.

In the invention the synthesis takes place by way of a catalyzed synthesis of an isocyanate-reactive compound, more particularly a hydroxy-functionalized polymer, and a polyisocyanate compound. Preferably a polyisocyanate is used.

Subsequently the prepolymer of the invention containing isocyanate groups that is obtainable in this way is reacted with an organosilane to give the silylated polyurethane of the invention.

The subsequent reaction of the polyurethane prepolymer of the invention with an organosilane of the formula (VIII) provides the silylated polyurethane

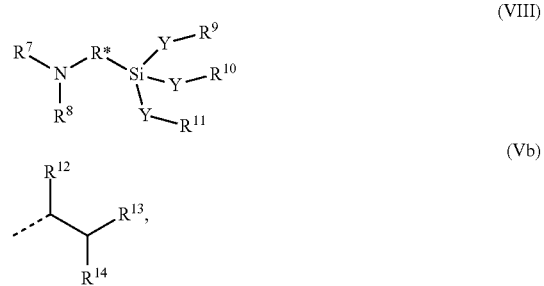

where
R⁷ is H,
R⁸ is H, an optionally substituted, straight-chain or branched C1 to C25 alkyl group, an optionally substituted, straight-chain or branched C2 to C25 alkenyl group or an optionally substituted C4 to C18 cycloalkyl group or an optionally substituted C4 to C18 aryl group or a radical of the general structure (Vb), R* is O or an optionally substituted, straight-chain or branched C1 to C25 alkyl group or an optionally substituted C4 to C18 cycloalkyl group or an optionally substituted C4 to C18 aryl group and if R*=O, the Si atom is connected directly to the N atom, $R^{12}$ and $R^{14}$ each independently of one another are H or a radical from the group consisting of —$R^{15}$, —COO$R^{15}$ and —CN, $R^{13}$ is H or is a radical from the group consisting of —CH$_2$—COO$R^{15}$, —COO$R^{15}$, —CONH$R^{15}$, —CON($R^{15}$), —CN, —NO$_2$, —PO(O$R^{15}$)$_2$, —SO$R^{15}$ and —SO$_2$O$R^{15}$, $R^{15}$ is a hydrocarbon radical having 1 to 20 C atoms and optionally containing at least one heteroatom, $R^9$, $R^{10}$ and $R^{11}$ independently of one another are H, an optionally substituted, straight-chain or branched C1 to C25 alkyl group, an optionally substituted, straight-chain or branched C2 to C25 alkenyl group or an optionally substituted C4 to C18 cycloalkyl group or an optionally substituted C4 to C18 aryl group; preferably at least one $R^9$ is a C2 alkyl group, more preferably $R^9$ and $R^{10}$ are each a C2 alkyl group, and each Y independently of any other is either O or a direct bond of the Si atom to the respective radical $R^9$, $R^{10}$ or $R^{11}$; and preferably at least one Y is O.

End groups of the invention in the silylated polyurethane may be described by the general formula (V)

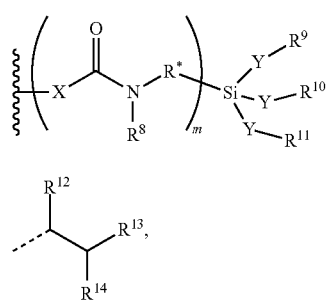

(V)

(Vb)

where
X is C, Si or a heteroatom and these, according to their valency, optionally have one or more radicals R⁸, is preferably C, N, O, P or S, more preferably C, N or O, very preferably N or O, and is bonded in each case to a carbon in the polymer backbone, R* is O or an optionally substituted, straight-chain or branched C1 to C25 alkyl group or an optionally substituted C4 to C18 cycloalkyl group or an optionally substituted C4 to C18 aryl group, preferably an optionally substituted, straight-chain or branched C1 to C15 alkyl group, and if R*=O, the Si atom is connected directly to the N atom, each Y independently of any other is either O or a direct bond of the Si atom to the respective radical $R^9$, $R^{10}$ or $R^{11}$, and preferably at least one Y is O, R⁸ is H, an optionally substituted, straight-chain or branched C1 to C25 alkyl group, an optionally substituted, straight-chain or branched C2 to C25 alkenyl group or an optionally substituted, straight-chain or branched C2 to C18 alkynyl group, an optionally substituted C4 to C18 cycloalkyl group or an optionally substituted C4 to C18 aryl group, or is a radical of the general structure (Vb), $R^{12}$ and $R^{14}$ each independently of one another are H or a radical from the group consisting of —$R^{15}$, —COO$R^{15}$ and —CN, $R^{13}$ is H or is a radical from the group consisting of —CH$_2$—COO$R^{15}$, —COO$R^{15}$, —CONH$R^{15}$, —CON($R^{15}$), —CN, —NO$_2$, —PO(O$R^{15}$)$_2$, —SO$R^{15}$ and —SO$_2$O$R^{15}$, $R^{15}$ is a hydrocarbon radical having 1 to 20 C atoms and optionally containing at least one heteroatom, $R^9$, $R^{10}$ and $R^{11}$ independently of one another are H or C1 or C2 alkyl group; preferably at least $R^9$ is a C2 alkyl group, more preferably $R_9$ and $R_{10}$ are each a C2 alkyl group, and m is 0 or 1 and if m=0, the Si atom is bonded directly to a carbon in the polymer backbone (P).

In a further alternative embodiment of all the above combinations, the silylated polyurethane is produced by reaction with an organosilane selected from the group of N-(triethoxysilyl)methyl]butylamine, N-[3-(triethoxysilyl)propyl]butylamine, diethyl N-(3-triethoxysilylpropyl)aminosuccinate or a mixture thereof.

In one alternative embodiment the polyurethane prepolymer of the invention is produced by a catalyzed synthesis of polypropylene glycol with isophorone diisocyanate (IPDI).

In one alternative embodiment the polyurethane prepolymer of the invention is produced by a catalyzed synthesis of polypropylene glycol with isophorone diisocyanate (IPDI) using DBTL.

In a further alternative embodiment the silylated polyurethane polymer of the invention is produced by a catalyzed synthesis of polypropylene glycol with isophorone diisocyanate (IPDI) and subsequent silanization with N-[3-(trimethoxysilyl)propyl]butylamine.

In a further alternative embodiment the silylated polyurethane polymer of the invention is produced by a catalyzed synthesis of polypropylene glycol with isophorone diisocyanate (IPDI) and subsequent silanization with N-[3-(trimethoxysilyl)propyl]butylamine using TiPOSS.

Alternatively, in the embodiments stated above, a polypropylene glycol having a number-average molecular weight of 18000 g/mol is used.

In a further alternative embodiment, it comprises additives from the group encompassing one or more fillers selected from the group of inorganic and organic fillers, especially natural, ground or precipitated calcium carbonates optionally coated with fatty acids, especially stearic acid; barite (heavy spar), talcs, quartz flours, quartz sand, dolomites, wollastonites, kaolins, calcined kaolins, mica (potassium aluminium silicate), molecular sieves, aluminium oxides, aluminium hydroxides, magnesium hydroxide, silicas, including finely divided silicas from pyrolysis processes, industrially manufactured carbon blacks, graphite, metal powders such as aluminium, copper, iron, silver or steel, PVC powders or hollow beads, one or more adhesion promoters from the group of the silanes, especially aminosilanes such as 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)-N'-[3-

(trimethoxysilyl)propyl]ethylenediamine and also analogues thereof having ethoxy or isopropoxy instead of the methoxy groups on silicon, aminosilanes having secondary amino groups, such as especially N-phenyl-, N-cyclohexyl- and N-alkylaminosilanes, and also mercaptosilanes, epoxysilanes, (meth)acrylosilanes, anhydridosilanes, carbamatosilanes, alkylsilanes and iminosilanes, and also oligomeric forms of these silanes, and also adducts of primary aminosilanes with epoxysilanes or (meth)acrylosilanes or anhydridosilanes. Especially suitable are 3-glycidoxypropyltrimethoxysilane, 3-aminopropyltrimethoxysilane, N-(2-aminoethyl)-3-aminopropyltrimethoxysilane, N-(2-aminoethyl)-N'-[3-(trimethoxysilyl)propyl]ethylenediamine, 3-mercaptopropyltrimethoxysilane, 3-ureidopropyltrimethoxysilane and the corresponding silanes with ethoxy groups instead of the methoxy groups, and also oligomeric forms of these silanes; one or more moisture scavengers from the group of silanes, especially tetraethoxysilane, vinyltrimethoxy- or vinyltriethoxysilane or organoalkoxysilanes, having a functional group in the a position to the silane group, especially N-(methyldimethoxysilylmethyl)-O-methyl carbamate, (methacryloyloxymethyl)silanes, methoxymethylsilanes, orthoformic esters, and also calcium oxide or molecular sieves, one or more plasticizers from the group of carboxylic esters such as phthalates, especially diisononyl 1,2-cyclohexandicarboxylate, dioctylphthalate, diisononylphthalate or diisodecylphthalate, adipates, especially dioctyladipate, azelates, sebacates, polyols, especially polyoxyalkylenpolyols or polyester polyols, glycol ethers, glycol esters, citrates, especially triethylcitrate, organic phosphoric and sulfonic esters, polybutenes, or fatty acid methyl or ethyl esters derived from natural fats or oils; one or more UV stabilizers from the group of organic (benzophenones, benzotriazoles, oxalanilides, phenyltriazines) and inorganic (titanium dioxide, iron oxide, zinc oxide) UV absorbers, and also antioxidants from the group of the sterically hindered phenols, amines and phosphites and phosphonites, one or more thixotropic agents from the group of sheet silicates such as bentonites, derivatives of castor oil, hydrogenated castor oil, polyamides, polyurethanes, urea compounds, fumed silicas, cellulose ethers or hydrophobically modified polyoxyethylenes, one or more wetting agents from the group of nonionic, anionic and cationic surfactants, or combinations thereof are selected.

In a further alternative embodiment the composition of the invention further comprises a water scavenger, preferably a vinyl alkoxy silane, more preferably vinyl trimethoxysilane (VTMO). It is always possible here that the alkoxy substituents (e.g. methoxy or ethoxy) of the alkoxysilanes in the composition of at least one silylated polyurethane are able to undergo mutual exchange with at least one water scavenger.

In the production of the polyurethane prepolymers and of the silylated polyurethanes obtainable from them, in accordance with the invention, preferably first either the entire isocyanate-containing compound (component I) or else the entire isocyanate-reactive compound, more particularly the hydroxy-functionalized polymer (component II), is taken as the initial charge, and then the respective other component I or II is added, followed by addition of at least one catalyst, and the components are reacted. The catalyst may be introduced as an initial charge before component I and II, or may be added to the component taken as an initial charge, or may be added to a mixture of component I and II. From the resultant polyurethane prepolymers of the invention, the silylated polyurethane is subsequently produced by reaction with the organosilane. If additionally one or further components are used, they may in principle be added to the reaction mixture at any desired point in time.

The process of the invention is carried out preferably in the absence of (atmospheric) moisture and at the pressure of the surrounding atmosphere, in other words about 900 to 1100 hPa.

The process of the invention may take place continuously, in a tubular reactor or tube reactor having multiple metering sites in parallel or else in series, for example, or batchwise, in a conventional reaction tank with stirrer system, for example.

EXAMPLES

I. GPC Data
Instrument and Parameters of STD-GPC Measurement:
Chromatographic System:
  Degasser: Agilent 1260 Infinity Degasser
  Pump: Agilent 1260 Infinity IsoPump
  Autosampler: Agilent 1260 Infinity ALS
  Column oven: Agilent 1290 Infinity II TCC
  RI detector: Agilent 1260 Infinity RID
  Software: PSS WinGPC UniChrom V 8.31, Build 8417
Chromatographic Conditions:
  DIN: DIN EN ISO 16014-1, DIN 55672-1
  Column: 1. PLgel 5µ Mixed D (Agilent Technologies)
    2. PLgel 5µ Mixed D (Agilent Technologies)
    3. PLgel 3 µm Mixed E (Agilent Technologies)
  Mobile Phase: Tetrahydrofuran
  Flow rate: 1 mL/min
  Temperature: 35° C.
  Injection volume: 100 µL
  Sample concentration: 1 g/L
  Molecular weight standards:
  PSS Polymer-Standards-Service GmbH, Mainz; Germany
  $M_p$ [Da]: 66000; 42400; 25500; 15700; 8680; 6540; 4920; 3470; 2280; 1306; 370; 266
  *The calibration curve is valid between 266 Da and 66000 Da. Values outside these limits are extrapolated.
II. Viscosity
The viscosities were determined using a Brookfield Rheometer DV-3T Extra at 25° C. Spindle size and spindle speed were selected such that the torque is >90%.
III. Infrared (IR) Spectroscopy:
IR monitoring was measured using a ThermoScientific Nicolet iS5 and iD7ATR unit. Evaluation took place with Omnic 9 Software.

Examples I

Chemicals Used:
  Acclaim 18200 (Covestro AG; low mono polyoxypropylene diol, OH number 6.0 mg KOH/g, water content approx. 0.02% by weight)
  3-Isocyanatomemyl-3,5,5-trimethyl cyclohexyl isocyanate (Desmodur® I, Covestro AG, Leverkusen)
  TiPOSS (heptaisobutyl POSS-titanium(IV) ethoxide), 20% solution in Hexamoll® DINCH, BASF)
  DBTL (dibutyltin dilaurate) BNT Chemicals
  DBA (di-n-butylamine) purity >99%, TCI Chemicals
  N-[3-(trimethoxysilyl)propyl]butylamine, DOG Deutsche Olfabrik
  VTMO, vinyltrimethoxysilane, Acros Organics
A) Production of the Polyurethane Prepolymers of the Invention Example 1

200 g (11 mmol) of polypropylene glycol having an approximate number-average molecular weight $M_n$ of 18000 g/mol (OH number=6.0±1.0 mg KOH/g) were charged to a 500 ml three-necked flask and dried under reduced pressure at 80° C. for one hour. The reduced pressure was subsequently broken with nitrogen. The polyol was cooled to 25° C. 0.01 g (0.016 mmol) of DBTL catalyst and 5.19 g (23 mmol) of isophorone diisocyanate (IPDI) were added with stirring. As soon as the theoretical NCO content of 0.52 wt % was reached, a determination was made of the viscosity of the NCO prepolymer [46000 mPas (25° C., Brookfield viscometer)]. For the GPC analysis the prepolymer was reacted with 3.02 g (23 mmol) of di-n-butylamine and stirred at 25° C. for 20 minutes. The reaction was monitored by IR spectroscopy (disappearance of the NCO band (2270 cm$^{-1}$)). The ratio of the area integral $F_I$ in the first section ($x_1$ to $x_2$) of the molar weight distribution and the area integral $F_{II}$ in the second section of the molar weight distribution, $F_{II}/F_I$, is 0.29.

Example 2

200 g (11 mmol) of polypropylene glycol having an approximate number-average molecular weight $M_n$ of 18000 g/mol (OH number=6.0±1.0 mg KOH/g) were charged to a 500 ml three-necked flask and dried under reduced pressure at 80° C. for one hour. The reduced pressure was subsequently broken with nitrogen. The polyol was cooled to 25° C. 0.01 g (0.011 mmol, pure substance) of TiPOSS catalyst and 5.19 g (23 mmol) of isophorone diisocyanate (IPDI) were added and the reaction mixture was stirred. As soon as the theoretical NCO content of 0.52 wt % was reached, a determination was made of the viscosity of the NCO prepolymer [44000 mPas (25° C., Brookfield viscometer)]. For the GPC analysis the prepolymer was reacted with 3.02 g (23 mmol) of di-n-butylamine and stirred at 25° C. for 20 minutes. The reaction was monitored by IR spectroscopy (disappearance of the NCO band (2270 cm$^{-1}$)). The ratio of the area integral $F_I$ in the first section ($x_1$ to $x_2$) of the molar weight distribution and the area integral $F_{II}$ in the second section ($x_2$ to $x_3$) of the molar weight distribution, $F_{II}/F_I$, is 0.27.

Examples 3 to 6 were prepared in accordance with the procedure of examples 1 and 2.

TABLE 1

| Example number | Catalyst | Catalyst amount | Reaction temperature | Viscosity [mPas] | Not inventive x | Area ratio |
|---|---|---|---|---|---|---|
| 1 | DBTL | 50 ppm | 25° C. | 46 000 | | 0.29 |
| 2 | TiPOSS | 50 ppm | 25° C. | 44 000 | | 0.27 |
| 3 | TiPOSS | 10 ppm | 80° C. | 43 000 | | |
| 4 | TiPOSS | 50 ppm | 80° C. | 48 000 | | 0.23 |
| 5 | TiPOSS | 37.5 ppm | 40° C. | 48 000 | | |
| 6 | TiPOSS | 84 ppm | 25° C. | 43 000 | | |
| 7 | DBTL | 50 ppm | 80° C. | 120 800 | x | 0.43 |

B) Production of the Silane-Terminated Polymers (STP), Also Called Silylated Polymers Silane-Terminated Polyols from the Reaction of Isocyanate Prepolymer.

Example 8

150.2 g (8.3 mmol) of polypropylene glycol having an approximate number-average molecular weight Ma of 18000 g/mol (OH number=6.0±1.0 mg KOH/g) were charged to a 500 ml three-necked flask and dried under reduced pressure at 90° C. for one hour. The reduced pressure was subsequently broken with nitrogen. The polyol was cooled to 80° C. 1.5 mg (0.0015 mmol, pure substance) of TiPOSS catalyst and 4.01 g (18 mmol) of isophorone diisocyanate (IPDI) were added with stirring. As soon as the theoretical NCO content of 0.52 wt % was reached, 4.97 g (21 mmol) of N-[3-(trimethoxysilyl)propyl]butylamine] were added with stirring and the system was cooled simultaneously to 25° C. The reaction was monitored by IR spectroscopy (disappearance of the NCO band (2270 cm$^{-1}$)). 2% by weight of VTMO was added to the completed STP. The viscosity of the product was 43000 mPas (25° C., Brookfield viscosity).

The invention claimed is:

1. Process for the production of polyurethane prepolymers with a molecular weight profile, measured by gel permeation chromatography, of the polyurethane prepolymers from 2000 Da ($x_1$) to 200000 Da ($x_3$) along an x-axis has a first section with an area integral $F_I$ and a second section with an area integral $F_{II}$, for which a ratio $F_{II}/F_I$ is between 0 up to and including 0.4, where the first section extends from $x_1$ to $x_2$ and the second section extends from $x_2$ to $x_3$, and $x_2$ defines an extreme point between the last intensity maximum (M1a) in the first section, situated in the region of the molecular weight of the hydroxy-functionalized polymer, and a subsequent intensity maximum (M2) in the second section, by a reaction of I. isophorone diisocyanate (IPDI) with II. a hydroxy-functionalized polymer having a number-average molecular weight Mn of 3500 to 100000 Da, in the presence of a catalyst, characterized in that, the molar ratio of NCO groups to hydroxyl groups in the reaction of I. with II. is from 3.0:1 to 1.8:1 and that the temperature in the reaction of I. with II. is between 20° C. and 90° C. and wherein the catalyst is heptaisobutyl POSS-titanium (IV) ethoxide (TiPOSS) and the total catalyst amount is between 3 and 80 ppm, based on the total weight of the hydroxy-functionalized polymer used.

2. Process according to claim 1, wherein the peak (M1a) corresponds to the molecular weight range of polyurethane prepolymers of the following formula A,

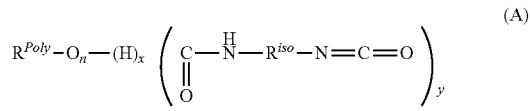

in which $R^{Iso}$ is the structural unit of IPDI and $R^{Poly}$ is the structural unit of the hydroxy-functionalized polymer, where n is x+y and the functionality n indicates the number of OH groups in the hydroxy functionalized polymer.

3. Process according to claim 1, characterized in that the hydroxy-functionalized polymer is selected from the group consisting of polyether polyols, polyester polyols, polycarbonate polyols and a mixture thereof.

4. Process according to claim 1, characterized in that the hydroxy-functionalized polymer is selected from the group consisting of polyoxyalkylene diols, polyoxyalkylene triols, and mixtures thereof.

5. Process according to claim 1, characterized in that the hydroxy-functionalized polymer is selected from the group consisting of polyester polyols and polyether polyols.

* * * * *